US009021262B2

(12) United States Patent
Krajec

(10) Patent No.: US 9,021,262 B2
(45) Date of Patent: Apr. 28, 2015

(54) OBFUSCATING TRACE DATA

(71) Applicant: Concurix Corporation, Kirkland, WA (US)

(72) Inventor: Russell S. Krajec, Loveland, CO (US)

(73) Assignee: Concurix Corporation, Kirkland, WA (US)

( * ) Notice: Subject to any disclaimer, the term of this patent is extended or adjusted under 35 U.S.C. 154(b) by 0 days.

(21) Appl. No.: 13/751,000

(22) Filed: Jan. 25, 2013

(65) Prior Publication Data

US 2014/0019756 A1 Jan. 16, 2014

(51) Int. Cl.
*H04L 29/06* (2006.01)
*H04L 29/14* (2006.01)
*H04L 29/08* (2006.01)
*H04L 12/24* (2006.01)
*G06F 21/52* (2013.01)
*G06F 21/62* (2013.01)
*H04L 12/26* (2006.01)
*G06F 11/34* (2006.01)

(52) U.S. Cl.
CPC ......... *H04L 63/0428* (2013.01); *H04L 63/0442* (2013.01); *H04L 69/40* (2013.01); *H04L 67/34* (2013.01); *H04L 41/28* (2013.01); *H04L 43/04* (2013.01); *H04L 41/069* (2013.01); *G06F 11/3404* (2013.01); *G06F 11/3409* (2013.01); *G06F 11/3466* (2013.01); *G06F 2201/865* (2013.01); *G06F 21/52* (2013.01); *G06F 21/6245* (2013.01)

(58) Field of Classification Search
CPC . H04L 63/0428; G06F 21/52; G06F 21/6245; G06F 11/3466
USPC .......................................................... 713/167
See application file for complete search history.

(56) References Cited

U.S. PATENT DOCUMENTS

| 7,185,367 | B2 | 2/2007 | Munson |
| 7,685,561 | B2 | 3/2010 | Deem et al. |
| 7,870,244 | B2 | 1/2011 | Chong et al. |
| 7,890,771 | B2 | 2/2011 | England et al. |
| 8,108,689 | B2 | 1/2012 | Nicolson et al. |

(Continued)

FOREIGN PATENT DOCUMENTS

| JP | 2012208830 A | 10/2012 |
| KR | 20120138586 A | 12/2012 |

OTHER PUBLICATIONS

International Search Authority, International Search Report and Written Opinion, Korean Intellectual Property Office, PCT/US2013/042030, Oct. 24 , 2013.

(Continued)

*Primary Examiner* — Mohammad W Reza
(74) *Attorney, Agent, or Firm* — Æon Law; Adam L. K. Philipp

(57) ABSTRACT

A tracer may obfuscate trace data such that the trace data may be used in an unsecure environment even though raw trace data may contain private, confidential, or other sensitive information. The tracer may obfuscate using irreversible or lossy hash functions, look up tables, or other mechanisms for certain raw trace data, rendering the obfuscated trace data acceptable for transmission, storage, and analysis. In the case of parameters passed to and from a function, trace data may be obfuscated as a group or as individual parameters. The obfuscated trace data may be transmitted to a remote server in some scenarios.

22 Claims, 14 Drawing Sheets

(56) References Cited

U.S. PATENT DOCUMENTS

| | | |
|---|---|---|
| 8,473,925 B2 | 6/2013 | Gagliardi et al. |
| 8,490,087 B2 | 7/2013 | Beaty et al. |
| 8,495,598 B2 | 7/2013 | Gounares et al. |
| 8,566,800 B2 | 10/2013 | Gagliardi |
| 8,595,327 B2 | 11/2013 | Lee et al. |
| 8,595,743 B2 | 11/2013 | Gounares et al. |
| 8,607,018 B2 | 12/2013 | Gounares et al. |
| 8,615,766 B2 | 12/2013 | Gounares |
| 8,645,930 B2 * | 2/2014 | Lattner et al. ............... 717/140 |
| 8,650,538 B2 | 2/2014 | Gounares |
| 8,656,134 B2 | 2/2014 | Gounares et al. |
| 8,656,135 B2 | 2/2014 | Gounares et al. |
| 8,656,378 B2 | 2/2014 | Gounares et al. |
| 8,694,574 B2 | 4/2014 | Gounares et al. |
| 8,700,838 B2 | 4/2014 | Gounares |
| 8,707,326 B2 | 4/2014 | Garrett |
| 8,726,255 B2 | 5/2014 | Gounares et al. |
| 8,752,021 B2 | 6/2014 | Li et al. |
| 8,752,034 B2 | 6/2014 | Gounares et al. |
| 2002/0073063 A1 | 6/2002 | Faraj |
| 2002/0184615 A1 | 12/2002 | Sumner et al. |
| 2003/0217155 A1 | 11/2003 | Greck et al. |
| 2004/0075690 A1 | 4/2004 | Cirne |
| 2005/0138111 A1 | 6/2005 | Aton et al. |
| 2006/0047752 A1 | 3/2006 | Hornby |
| 2006/0195747 A1 | 8/2006 | Pramanick et al. |
| 2006/0230319 A1 | 10/2006 | Ryali et al. |
| 2007/0061241 A1 | 3/2007 | Jovanovic et al. |
| 2007/0294581 A1 | 12/2007 | Dean et al. |
| 2008/0005281 A1 | 1/2008 | Hsueh et al. |
| 2008/0126828 A1 | 5/2008 | Girouard et al. |
| 2010/0180346 A1 * | 7/2010 | Nicolson et al. ............... 726/26 |
| 2010/0205583 A1 | 8/2010 | Gebhardt et al. |
| 2010/0257019 A1 * | 10/2010 | Chickering et al. ............ 705/10 |
| 2010/0306854 A1 | 12/2010 | Neergaard |
| 2010/0318994 A1 | 12/2010 | Holmberg et al. |
| 2011/0098973 A1 | 4/2011 | Seidman |
| 2011/0167414 A1 * | 7/2011 | Lattner et al. ............... 717/140 |
| 2011/0276951 A1 | 11/2011 | Jain |
| 2012/0072579 A1 | 3/2012 | Teather |
| 2012/0167081 A1 | 6/2012 | Sedayao et al. |
| 2012/0222019 A1 | 8/2012 | Gounares et al. |
| 2012/0222043 A1 | 8/2012 | Gounares et al. |
| 2012/0227040 A1 | 9/2012 | Gounares |
| 2012/0233592 A1 | 9/2012 | Gounares |
| 2012/0233601 A1 | 9/2012 | Gounares et al. |
| 2012/0278504 A1 * | 11/2012 | Ang et al. ............... 709/246 |
| 2012/0317371 A1 | 12/2012 | Gounares et al. |
| 2012/0317389 A1 | 12/2012 | Gounares et al. |
| 2012/0317421 A1 | 12/2012 | Gounares et al. |
| 2012/0317557 A1 | 12/2012 | Garrett et al. |
| 2012/0317577 A1 | 12/2012 | Garrett et al. |
| 2012/0317587 A1 | 12/2012 | Garrett et al. |
| 2012/0324454 A1 | 12/2012 | Gounares et al. |
| 2012/0324527 A1 | 12/2012 | Brown et al. |
| 2013/0067445 A1 | 3/2013 | Gounares et al. |
| 2013/0073523 A1 | 3/2013 | Gounares et al. |
| 2013/0073604 A1 | 3/2013 | Gounares et al. |
| 2013/0073829 A1 | 3/2013 | Gounares et al. |
| 2013/0073837 A1 | 3/2013 | Li et al. |
| 2013/0074049 A1 | 3/2013 | Gounares et al. |
| 2013/0074055 A1 | 3/2013 | Gounares et al. |
| 2013/0074056 A1 | 3/2013 | Gounares et al. |
| 2013/0074057 A1 | 3/2013 | Gounares et al. |
| 2013/0074058 A1 | 3/2013 | Gounares et al. |
| 2013/0074092 A1 | 3/2013 | Gounares et al. |
| 2013/0074093 A1 | 3/2013 | Gounares et al. |
| 2013/0080642 A1 | 3/2013 | Adam et al. |
| 2013/0080760 A1 | 3/2013 | Li et al. |
| 2013/0080761 A1 | 3/2013 | Garrett et al. |
| 2013/0081005 A1 | 3/2013 | Gounares et al. |
| 2013/0085882 A1 | 4/2013 | Gounares et al. |
| 2013/0091508 A1 | 4/2013 | Srinivasan |
| 2013/0117753 A1 | 5/2013 | Gounares et al. |
| 2013/0117759 A1 | 5/2013 | Gounares et al. |
| 2013/0145015 A1 | 6/2013 | Malloy et al. |
| 2013/0185433 A1 | 7/2013 | Zhu et al. |
| 2013/0185729 A1 | 7/2013 | Vasic et al. |
| 2013/0205009 A1 | 8/2013 | Malloy et al. |
| 2013/0219057 A1 | 8/2013 | Li et al. |
| 2013/0219363 A1 | 8/2013 | Wu Sung et al. |
| 2013/0219372 A1 | 8/2013 | Li et al. |
| 2013/0227529 A1 | 8/2013 | Li et al. |
| 2013/0227536 A1 | 8/2013 | Li et al. |
| 2013/0229416 A1 | 9/2013 | Krajec et al. |
| 2013/0232174 A1 | 9/2013 | Krajec et al. |
| 2013/0232433 A1 | 9/2013 | Krajec et al. |
| 2013/0232452 A1 | 9/2013 | Krajec et al. |
| 2013/0282545 A1 | 10/2013 | Gounares et al. |
| 2013/0283102 A1 | 10/2013 | Krajec et al. |
| 2013/0283240 A1 | 10/2013 | Krajec et al. |
| 2013/0283241 A1 | 10/2013 | Krajec et al. |
| 2013/0283242 A1 | 10/2013 | Gounares |
| 2013/0283246 A1 | 10/2013 | Krajec et al. |
| 2013/0283247 A1 | 10/2013 | Krajec et al. |
| 2013/0283281 A1 | 10/2013 | Krajec et al. |
| 2013/0298112 A1 | 11/2013 | Gounares et al. |
| 2014/0013306 A1 | 1/2014 | Gounares et al. |
| 2014/0013308 A1 | 1/2014 | Gounares et al. |
| 2014/0013309 A1 | 1/2014 | Gounares |
| 2014/0013311 A1 | 1/2014 | Garrett et al. |
| 2014/0019598 A1 | 1/2014 | Krajec |
| 2014/0019756 A1 | 1/2014 | Krajec |
| 2014/0019879 A1 | 1/2014 | Krajec et al. |
| 2014/0019985 A1 | 1/2014 | Krajec |
| 2014/0025572 A1 | 1/2014 | Krajec |
| 2014/0026142 A1 | 1/2014 | Gounares et al. |
| 2014/0040591 A1 | 2/2014 | Gounares |

OTHER PUBLICATIONS

International Search Authority, International Search Report and Written Opinion, Korean Intellectual Property Office, PCT/US2013/042788, Sep. 5, 2013.

International Search Authority, International Search Report and Written Opinion, Korean Intellectual Property Office, PCT/US2013/042789, Sep. 30, 2013.

International Search Authority, International Search Report and Written Opinion, Korean Intellectual Property Office, PCT/US2013/042081, Nov. 28, 2013.

* cited by examiner

OBFUSCATING TRACE DATA

BACKGROUND

Tracing gathers information about how an application executes within a computer system. Trace data may include any type of data that may explain how the application operates, and such data may be analyzed by a developer during debugging or optimization of the application. In many cases, trace data may be used for debugging an application as well as understanding and optimizing the application. Trace data may also be used by an administrator during regular operation of the application to identify any problems.

SUMMARY

An instrumented execution environment may connect to an execution environment to provide detailed tracing and logging of an application as it runs. The instrumented execution environment may be configured as a standalone service that can be configured and purchased. The instrumented execution environment may be deployed with various authentication systems, administrative user interfaces, and other components. The instrumented execution environment may engage a customer's system through a distributor that may manage an application workload to distribute work to the instrumented execution environment as well as other worker systems. A marketplace may provide multiple preconfigured execution environments that may be selected, further configured, and deployed to address specific data collection objectives.

A load balanced system may incorporate instrumented systems within a group of managed devices and distribute workload among the devices to meet both load balancing and data collection. A workload distributor may communicate with and configure several managed devices, some of which may have instrumentation that may collect trace data for workload run on those devices. Authentication may be performed between the managed devices and the workload distributor to verify that the managed devices are able to receive the workloads and to verify the workloads prior to execution. The workload distributor may increase or decrease the amount of instrumentation in relation to the workload experienced at any given time.

A parallel tracer may perform detailed or heavily instrumented analysis of an application in parallel with a performance or lightly instrumented version of the application. Both versions of the application may operate on the same input stream, but with the heavily instrumented version having different performance results than the lightly instrumented version. The tracing results may be used for various analyses, including optimization and debugging.

A tracer may obfuscate trace data such that the trace data may be used in an unsecure environment even though raw trace data may contain private, confidential, or other sensitive information. The tracer may obfuscate using irreversible or lossy hash functions, look up tables, or other mechanisms for certain raw trace data, rendering the obfuscated trace data acceptable for transmission, storage, and analysis. In the case of parameters passed to and from a function, trace data may be obfuscated as a group or as individual parameters. The obfuscated trace data may be transmitted to a remote server in some scenarios.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Tracing as a Service

Figure 1:
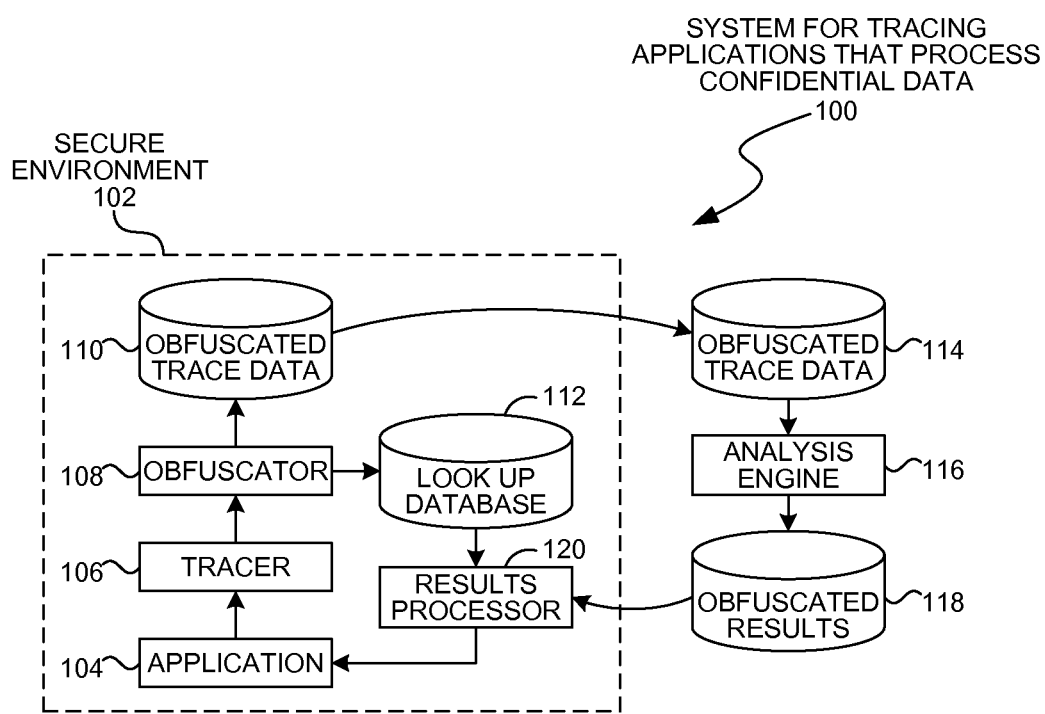
FIG. 1 is a diagram illustration of an embodiment showing a system for tracing applications that process confidential data.

An instrumented execution environment may be deployed as a service. After creating an account, a user may add the instrumented execution environment to a workload distributor within the user's own execution environment. The workload distributor may receive an incoming workload stream and direct some or all of the workload to the instrumented execution environment.

The instrumented execution environment may contain software, hardware, and other components that may capture various information while processing a workload. The instrumentation may collect various trace data that may be stored and analyzed. In some cases, the trace data may be analyzed after collection while in other cases, trace data may be analyzed on a real time basis.

A user may use an administrative user interface to configure the instrumented execution environment for use with a distributor. The user may be able to establish an account, determine a payment mechanism, and select various features of an instrumented execution environment.

The administrative activities may also include creating various authentication keys or other mechanisms that may authenticate the interacting systems to each other. The authentication system may be used to verify that the instrumented execution environment has been permitted to receive the output of a distributor, and that the distributor is authorized to send work items to the instrumented execution environment.

A distributor may be added to a user's execution environment to introduce a redirection point or decision point in an application. In some cases, the distributor may be an application that intercepts an input stream and applies both load balancing and instrumentation logic to identify an execution environment to process a given work item. In some cases, the distributor may be executable code that may be included in a library that may be called from within an application.

The instrumentation may be provided as a service to a developer or administrator of an application. The instrumentation may collect data using sophisticated tools and analysis that may be complex to install, configure, or operate. A user may pay for such a service using many different payment schemes, such as paying based on part on how much processing, storage, or other resource may be consumed. In some cases, the payment may be a subscription for use over a period of time, such as a fixed fee payment for a month of service. Many other payment schemes may be deployed.

Tracing with a Workload Distributor

A load balanced or other managed computation environment may distribute work items to instrumented and non-instrumented systems. The load balancing or distribution may occur with consideration of instrumentation objectives for an application. In one example, the instrumentation may be performed when the load on the systems may allow, but instrumentation may be reduced or eliminated when load factors increase.

The workload distributor may have several instrumentation objectives that define conditions to collect data as well as the data to be collected. The objectives may include items such as sampling rates, events or conditions that start or stop instrumentation, quantity or quality of data to be collected, as well as the specific parameters or types of instrumentation to be applied.

The workload distributor may transmit instrumentation objectives to a worker system, where the objectives may cause the worker system to collect the described data. In such cases, the distributor may be able to create customized objectives for instrumenting each work item.

The computation environment may have multiple worker systems that execute work items as defined by a distributor. Each worker system may register with the distributor, which may include initial contact and registration as well as establishing an authentication mechanism between the devices. The status of the worker systems may be collected periodically and used to determine availability to perform a given work item.

Parallel Tracing

A heavily instrumented tracer may operate in parallel with a lightly instrumented tracer to capture both detailed and performance measurements of an application. In many cases, heavy instrumentation may adversely affect the performance of an application, thereby corrupting any performance metrics that may be collected at the same time. As the instrumentation becomes more detailed, the performance metrics generally may become more affected.

The tracing system may operate in parallel to trace in a performance environment that may capture only performance metrics, while another detailed tracer may capture detailed results. In some cases, the same application workload may be analyzed in parallel and the performance and detailed results may be aggregated together to produce a complete representation of the application.

The architecture of a parallel tracing system may be deployed in a distributed computing environment. In such an environment, multiple devices or processors may each perform some of the work of an application. A computing cluster may be one example of a distributed computing environment where multiple devices each execute a portion of an input stream.

A single device may be capable of parallel tracing. A multiprocessor device may have some processors that may process an application workload in a high performance manner while other processors execute the application using a detailed tracer.

The concept of parallel tracing may be applied to a single system or single processor system. In such a system, the separate tracing operations may be performed sequentially. For example, a first run of an application workload may be performed using a performance level instrumentation followed by a second run of the workload using a detailed instrumentation system. In such an embodiment, the input stream may be captured for later execution in a detailed manner.

A distributor may identify units of work from an input stream to transmit to different components. A unit of work may be any computing workload that may be executed in a relatively independent fashion. For each program or application, the units of work may be different.

In some applications, a unit of work may be a function call that may include input parameters for the function. For functional languages, such as Erlang, Haskell, Scala, F#, or for non-functional languages that are written in a functional manner, portions of an application may be able to be computed independently. In some cases, the units of work may have dependencies or other interactions with other units of work.

A unit of work may be an input item or request made to an application. In an example of an application programming interface, a call to the interface may be considered a unit of work that may be executed by an instance of the application. Such requests may or may not depend on other requests, but in general many such systems may have requests that may operate independently from other requests.

In some cases, a unit of work that may be executed by two differently instrumented systems may return different results. In a simple example, a unit of work may perform a function based on the exact time of day. In such an example, a unit of work executed on performance level instrumentation would return a different value than the same unit of work executed on a highly instrumented system that may be considerably slower.

When a unit of work executed on two different systems returns different values, an algorithm may be applied to determine a return value. In systems where latency, response time, or other performance related factors may adversely affect results, results from a performance level instrumented system may be used while results collected from highly instrumented system may be discarded. In some cases, the results from the performance level instrumented system may be discarded in favor of results from a highly instrumented system. In still other cases, averages or other summaries may be used to aggregate the application results from two separate runs of a unit of work.

Obfuscating Trace Data

A tracer may obfuscate data collected from an application and transmit obfuscated data to an analysis engine. The analysis engine may perform all analyses on the obfuscated data, such that the analysis engine may not be exposed to any confidential, private, or otherwise sensitive data contained in the tracer-collected data.

A tracer may collect data during the execution of an application. The application may process data that may be sensitive. When the tracer encounters application data, such data may be obfuscated prior to analysis. The obfuscated data may then be analyzed to understand, categorize, optimize, or perform other functions relating to the application. In some cases, the analysis may generate recommendations or other results that may refer to specific data elements that may be obfuscated. In such cases, a mechanism for determining the underlying data values may be provided through a reverse obfuscation process.

The obfuscation process may consist of a hash function, which may be lossy or not. In other embodiments, the obfuscation process may be an encryption process that may or may not be cryptographically secure. Still other embodiments may employ a lookup table maintained on a client device that translates a meaningful data value to an arbitrary value for analysis.

Multiple values may be hashed or otherwise considered as a single element in the tracer output. For example, a function may be called with three arguments. In some embodiments, the three arguments may be combined into a single argument and hashed or otherwise obfuscated into a single value. In other embodiments, the three arguments may be individually obfuscated and stored as three separate values.

Throughout this specification and claims, the terms "profiler", "tracer", and "instrumentation" are used interchangeably. These terms refer to any mechanism that may collect data when an application is executed. In a classic definition, "instrumentation" may refer to stubs, hooks, or other data collection mechanisms that may be inserted into executable code and thereby change the executable code, whereas "profiler" or "tracer" may classically refer to data collection mechanisms that may not change the executable code. The use of any of these terms and their derivatives may implicate or imply the other. For example, data collection using a "tracer" may be performed using non-contact data collection in the classic sense of a "tracer" as well as data collection using the classic definition of "instrumentation" where the executable code may be changed. Similarly, data collected through "instrumentation" may include data collection using non-contact data collection mechanisms.

Further, data collected through "profiling", "tracing", and "instrumentation" may include any type of data that may be collected, including performance related data such as processing times, throughput, performance counters, and the like. The collected data may include function names, parameters passed, memory object names and contents, messages passed, message contents, registry settings, register contents, error flags, interrupts, or any other parameter or other collectable data regarding an application being traced.

Throughout this specification and claims, the term "execution environment" may be used to refer to any type of supporting software used to execute an application. An example of an execution environment is an operating system. In some illustrations, an "execution environment" may be shown separately from an operating system. This may be to illustrate a virtual machine, such as a process virtual machine, that provides various support functions for an application. In other embodiments, a virtual machine may be a system virtual machine that may include its own internal operating system and may simulate an entire computer system. Throughout this specification and claims, the term "execution environment" includes operating systems and other systems that may or may not have readily identifiable "virtual machines" or other supporting software.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a tracing system for an application that processes sensitive data. Embodiment 100 is a simplified example of a system where tracing may occur within a secure environment, then trace data may be analyzed in an unsecure environment without compromising the integrity of the sensitive data.

Embodiment 100 illustrates an example of a tracing system that gathers data in a secure environment and obfuscates the data prior to sending the data to a remote system for analysis.

The remote system may be in an unsecured environment, but because the sensitive data are obfuscated, any analysis on those data can be performed without compromising the security of the underlying data.

In an example, a secure environment 102 may have an application 104 that may process sensitive data. The sensitive data may be, for example, credit card numbers, social security numbers, employment data, healthcare data, classified military data, financial data, or any other type of data that may be sensitive from a legal, business, personal, or other perspective.

A tracer 106 may monitor the application 104 to collect performance and operational data while the application 104 executes. The tracer 106 may examine individual functions, threads, processes, messages, data objects, and other information and that are part of the application or may be handled by the application. The tracer 106 may perform low-level inspection of various program elements, the results of which may be used to analyze the program execution. Such analysis may be for debugging, auditing, optimization, or other purposes.

In many cases, the tracer 106 may handle or come in contact with information that includes sensitive data. In such a circumstance, the data may be obfuscated prior to leaving the secure environment 102. In a simple example, a function may receive a data object, such as a raw credit card number. A trace of the function may collect the credit card number as a value passed to the function. In another example, a message passed from one thread to another may contain unfiltered financial information, a medical record object, or other sensitive information. During normal tracing operations, such sensitive data may be collected, but the sensitive data may be obfuscated before passing the data outside of the secure environment.

When sensitive data are collected and handled within the secure environment 102, the data may be considered safe. In a typical secure environment 102, data may be processed in a facility that complies with various privacy and security standards and procedures. Such facilities may maintain physical security that limits access to certain personnel, as well as network security that restricts access to the data.

An obfuscator 108 may obfuscate some or all of the trace data to create obfuscated trace data 110. The obfuscator 108 may use various hash functions, encryption algorithms, substitution schemes, or other techniques to make protect the sensitive data. In some cases, the obfuscator 108 may create a lookup database 112 that may contain the raw and obfuscated values for the traced data.

The obfuscated trace data 110 may be transmitted outside the secure environment 102. The obfuscated trace data 114 may be located on a remote device or other system that may have an analysis engine 116 that may perform analytics, optimizations, or other analyses on the obfuscated trace data 114. The results of the analysis engine 116 may reference individual data items or may contain references to data elements that remain obfuscated.

The results 118 may be passed back into the secure environment 102 and acted upon by a results processor 120. The results processor 120 may determine the raw data values from the obfuscated data values. In some cases, such an operation may involve looking up the raw data value from the lookup database 112.

In one use scenario, a tracer 106 may analyze an application 104 that may handle bank account information, for example. The tracer 106 may identify a function to monitor, where the function receives a bank account number and returns a balance. In this example, the bank account number and the balance may be treated as private information.

The tracer 106 may detect that the function has been called and may capture the data sent to the function and the data returned by the function. In this case, the bank account information has been transferred to the function and the balance returned. The function may be called many times, and the tracer 106 may capture each time the function is called. After monitoring the application 104 for a period of time, the trace data may contain bank account information and balance information.

Before transmitting the trace data outside of the secure environment 102, an obfuscator 108 may obfuscate the trace data to create obfuscated trace data 110. Once obfuscated, the data may be analyzed by a remote system to determine performance metrics or debugging information for the application 104.

The analysis may handle each data object using the obfuscated value. In an example, a debugging analysis may determine that a specific input value to the function causes an unexpected behavior to the function. Because the analysis is performed on the obfuscated data, the analysis results may be transmitted back to the secure environment 102 where the original value for the trace data may be determined and action taken on the results.

In such a scenario, the sensitive data may be kept within the secure environment 102, yet the analysis may be performed in an environment that does not share the same level of security. For example, a trace analyzer or program optimizer may analyze applications that may be secret, secure, private, or otherwise sensitive, yet the results may be transmitted and analyzed in a relatively open environment. For example, the obfuscated trace data 110 may be transmitted in clear text with minimum or no encryption and stored in a facility that may not meet the high security standards of the application 104.

The analysis engine 116 may be an automated, semi-automated, or manual analysis of the obfuscated trace data 114. The results 118 may contain direct references to the obfuscated trace data 114, such as identifying the data values that caused an error condition, for example. However, because the analyses may be performed only on obfuscated trace data 114, the analysis engine 116 may not be exposed to the underlying raw data.

In some cases, the remote system may collect data from multiple users, each of which may produce obfuscated trace data. The data from each user may be combined into a single database containing trace data from many sources. In such cases, the remote system may store only obfuscated data and sensitive data may be kept within the secure environment 102.

The obfuscator 108 may create obfuscated trace data 110 using several different mechanisms. In some cases, the obfuscation mechanisms may or may not be lossy.

An example of a non-lossy system may be an encryption system that may use a key to encrypt the data. In such a system, the obfuscator 108 may encrypt the data items using the key and the analysis engine 116 may process the encrypted data objects. Once the results 118 are returned to the secure environment 102, the results processor 120 may decrypt the results 118 using the key. Such a system may not use a lookup database 112 to re-create the raw values from the obfuscated values.

Another example of a non-lossy system may be the use of a non-reversible secure hash, such as MD5, SHA, or other hash functions. Such functions may have none or very few collisions, but may be extremely difficult to extract the original value from the obfuscated value. In such systems, a lookup database 112 may be used to store the hashed and raw values, so that results 118 may be converted back to raw, un-hashed values.

An example of a lossy system may apply a lossy hash function, such as a checksum or other lossy compression technique to the raw data. Examples of such systems may be hash functions that have many collisions. Such a system may create obfuscated data elements that may not be reversed into a single value with a degree of certainty.

An example of another system, a lookup database 112 may be used to assign a random or sequential value to a raw value. For example, a record for each new raw value may be assigned an incrementing index and the index may serve as the obfuscated value. Because the lookup database 112 may contain sensitive data, the lookup database 112 may be stored and protected within the secure environment 102.

In some embodiments, different types of obfuscation may be applied to different trace data. For example, highly sensitive data elements may be obfuscated with encryption while less sensitive data elements may be obfuscated with a simpler hash function. Such an embodiment may apply more computationally expensive obfuscation to more sensitive data and less computationally expensive obfuscation to less sensitive data.

Some trace data may be stored in cleartext or may not be obfuscated. For example, some embodiments may store function names in cleartext yet may obfuscate data passed to and from a function. In general, a function name, parameter name, variable name, or other hard coded descriptors within an application may describe operations of an application but not the underlying data that may be processed.

Cleartext descriptors of application elements may be extracted from a source code description of the application. Some embodiments may include a source code analyzer that extracts the descriptors of various application elements. In some embodiments, such analyzers may be built into a compiler, the output of which may include debugging or tagging information.

Cleartext descriptors of application elements, such as functions, variables, data objects, methods, or other elements may give a developer and administrator meaningful feedback regarding the performance of their application, even when the underlying data may be obfuscated. For example, an analysis engine 116 may identify function FOO has behaving in a certain manner and provide feedback that names function FOO. An application developer may recognize function FOO and be able to take action. Such an analysis may be performed in an unsecure manner using obfuscated data elements but with cleartext representations of program elements.

Cleartext descriptors of application elements may include function names, variable names, data object names, record descriptors, column descriptors, annotations, method names, class names, library names, file names, parameter names, tags, control flow diagrams, and other descriptors. Typically, such descriptors may be created by a programmer or developer and may reflect the programmer's intent or logic.

In certain circumstances, such descriptors may reflect confidential information. The confidential information may be the underlying logic or program flow, which may be separate from the confidential nature of the data handled by the application. For example, an application that processes healthcare records may have a proprietary or trade secret method for analyzing a healthcare record. While the healthcare record itself may be confidential under HIPPA or other statutory or regulatory provisions, the methodology of the application may be a separate class of confidential information.

In cases where such descriptors reflect application logic, third party analysis may be performed under a nondisclosure agreement, privacy arrangement, or other confidentiality provision as the third party may be exposed to the underlying methodology in an application but not be exposed to the data handled by the application.

Figure 2:
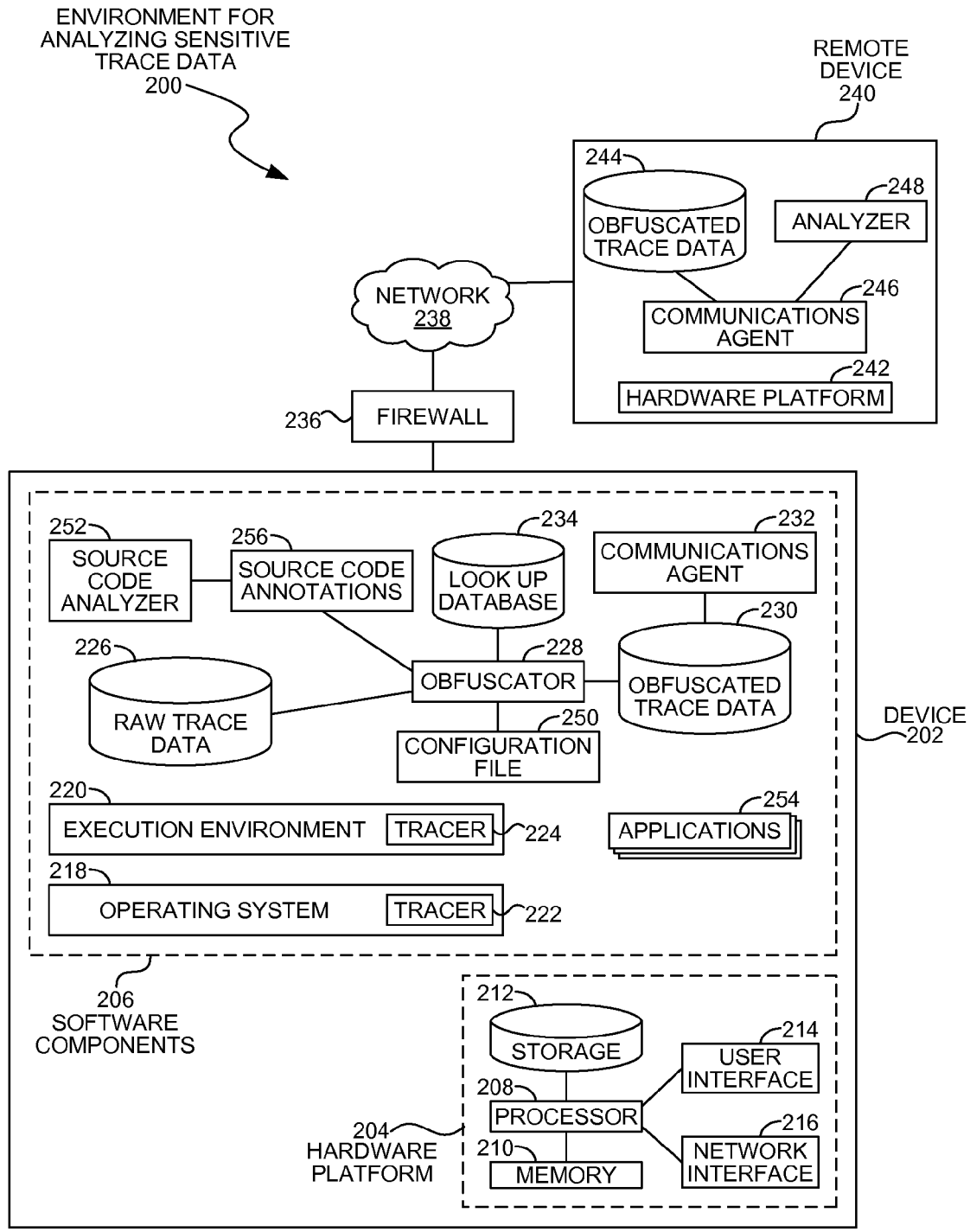
FIG. 2 is a diagram illustration of an embodiment showing a network environment for analyzing sensitive trace data.

FIG. 2 is a diagram of an embodiment 200 showing a computer system that transmits obfuscated trace data to a remote device for analysis. Embodiment 200 illustrates hardware components that may deliver the operations described in embodiment 100, as well as other embodiments.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components 206. The device 202 as illustrated represents a conventional computing device, although other embodiments may have different configurations, architectures, or components.

In many embodiments, the device 202 may be a server computer. In some embodiments, the device 202 may still also be a desktop computer, laptop computer, netbook computer, tablet or slate computer, wireless handset, cellular telephone, game console or any other type of computing device.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The client 202 may have an operating system 218 that may execute various applications 254. In some embodiments, an execution environment 220 may execute the applications 254. In either case, the operating system 218 or execution environment 220 may manage execution of the applications 254 by managing resources consumed by the applications 254 as well as controlling the execution.

The resources managed by the operating system 218 or execution environment 220 may be memory resources, network resources, input/output resources, processor resources, and other resources. The operating system 218 or execution environment 220 may allocate memory, perform garbage collection, schedule processor availability, prioritize and allocate storage resources, and other functions. In some embodiments, the execution environment 220 may be referred to as a virtual machine.

Tracers 222 and 224 may operate within the operating system 218 or execution environment 220. The tracers 222 and 224 may monitor the execution of an application 254 and collect various information, including performance data, operational data, debugging data, and other types of information. In many cases, the tracers 222 and 224 may be exposed to sensitive data that may be processed by an application 254.

Raw trace data 226 may be the data as-collected by the tracers 222 or 224. The raw trace data 226 may include data elements processed by the applications 254, as well as references to application elements such as function names and other descriptors.

An obfuscator 228 may process the raw trace data 226 to create obfuscated trace data 230. The obfuscator 228 may obfuscate some or all of the raw trace data 226 using various mechanisms. In some cases, only certain elements may be obfuscated while other elements in the raw trace data 226 may remain in a cleartext format.

In some embodiments, a source code analyzer 252 may create a set of source code annotations 254. The source code annotations 254 may be used to decorate the raw trace data 226 with meaningful function names and other information.

The source code annotations 254 may be annotations, tags, labels, or other information that may be derived from source code. Such information may be created by a compiler, debugging tool, or other source. In some cases, source code annotations 254 may be created by a dedicated source code analyzer 252.

A communications agent 232 may transmit the obfuscated trace data 230 to a remote device 240 for processing. The remote device 240 may be located outside of a secure environment which may be protected by a firewall 236 as well as other security measures. The communications agent 232 may pass the obfuscated trace data 230 through a firewall 236 and network 238 to the remote device 240.

The remote device 240 may operate on a hardware platform 242. The hardware platform 242 may be similar to the hardware platform 204. In some instances, the hardware platform 242 may be a virtual machine, cloud computing system, computing cluster, or some other execution environment.

A communications agent 246 may receive obfuscated trace data 230 from the device 202 and store the obfuscated trace data 244. An analyzer 248 may perform analyses against the obfuscated trace data 244 to generate various analysis results, which may be debugging and performance information, optimization information, or any other type of analysis results.

The obfuscated trace data 244 may contain trace data from multiple devices 202. In such embodiments, the trace data from two or more devices may be combined to create a more comprehensive trace data set than what may be created from merely one device.

In some embodiments, results from the remote device 240 may be transmitted to the device 202 for further inspection and use. In such embodiments, a lookup database 234 may be populated with obfuscated and raw data elements. The lookup database 234 may be used to translate from obfuscated results to more meaningful results when results are received from a remote device 240.

Figure 3:
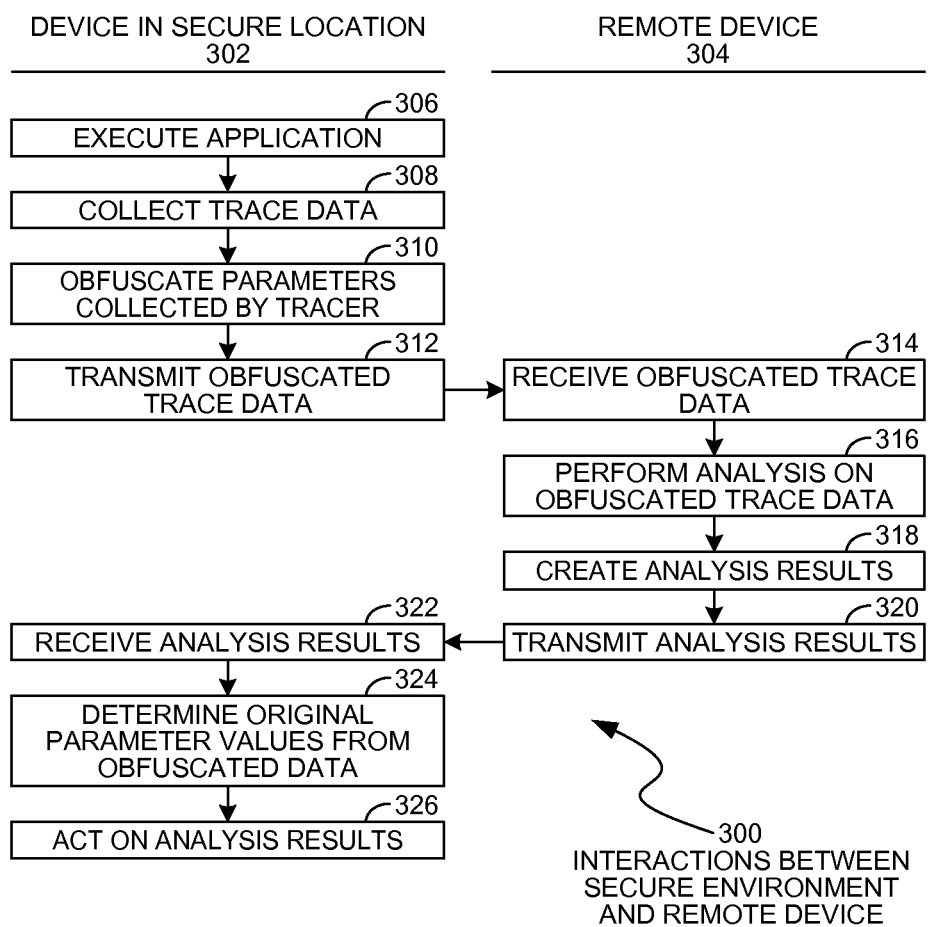
FIG. 3 is a timeline illustration of an embodiment showing interactions between a secure environment and a remote device.

FIG. 3 is a flowchart illustration of an embodiment 300 showing a method for installing and monitoring executable code. Embodiment 300 illustrates the operations of a client device 302 in the left hand column and a remote device 304 in the right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates an interaction between a device 302 in a secure location with a remote device 304 which may be outside the secure location. Trace data are gathered on the device 302, obfuscated, and transmitted to the remote device 304. The remote device 304 may process only the obfuscated data to create certain results, which are returned to the device 302 and de-obfuscated.

On the device 302, an application may be executed in block 306. While the application executes, trace data may be gathered in block 308. Some or all of the parameters may be obfuscated using hashing, encryption, lookup tables, randomization, or other obfuscation techniques.

The obfuscated data may be transmitted in block 312 to the remote device 304, which may receive the obfuscated data in block 314.

The remote device 304 may perform analysis on the obfuscated trace data in block 316 to generate analysis results in block 318. The analysis results may be transmitted in block 320 to the device 302, which may receive the analysis results in block 322.

The device 302 may de-obfuscate the data in block 324 and act on the analysis results in block 326. The de-obfuscating in block 324 may employ a mechanism that determines a raw, original value from results computed from obfuscated data.

Figure 4:
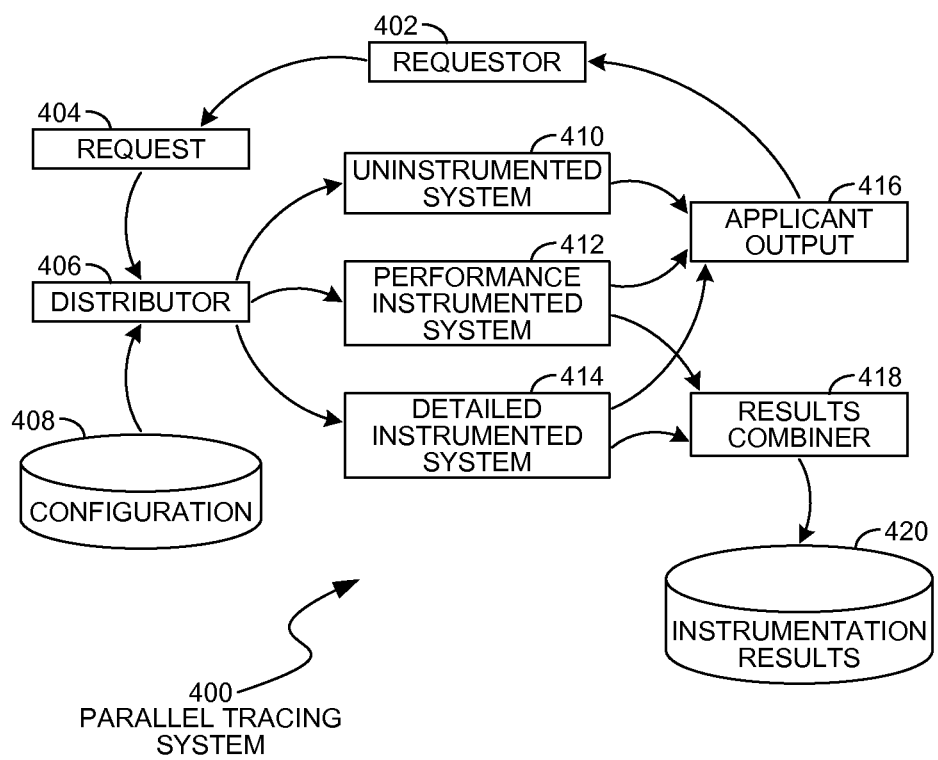
FIG. 4 is a diagram illustration of an embodiment showing a parallel tracing system.

FIG. 4 is a diagram illustration of an embodiment 400 showing a parallel tracing system. Embodiment 400 illustrates a high level view of a system that has a distributor that may send units of work to different systems, which may include systems for performance measurements as well as detailed instrumentation or profiling.

Embodiment 400 may be an example of a system where units of work may be executed in different environments, which may include execution under no instrumentation, performance level instrumentation, and detailed instrumentation. In many cases, an increasing level of instrumentation may cause performance to degrade. However, a more complete understanding about an application may combine both performance and detailed instrumentation results. By collecting trace data from two different environments, the performance related data may be unaffected by the detailed tracing.

A single unit of work may be analyzed by two different systems. In such systems, the performance results and detailed tracing results may be combined for those units of work. Such systems may tag the tracing results with an identifier that may allow an aggregator to match the results to the same unit of work.

In other embodiments, a single unit of work may be analyzed only one time. In such systems, results from performance and detailed analyses may be combined to give an overall picture without being able to directly compare individual units of work. Such a picture may be statistically significant when the distribution of workloads to each type of analysis may have a statistically normal distribution, for example.

A requestor 402 may send a request 404 to a distributor 406. The request 404 may be a workload to be processed by a cluster of execution environments. In one example, the request 404 may be a call to an application programming interface, where the application programming interface may be executed by a computing cluster. In another example, a request 404 may be a workload within a high performance computing system. In still another example, the request 404 may be a function or method call within a computer application.

The distributor 406 may analyze the request 404 to determine how to route the request 404. In the example of embodiment 400, the request 404 may be routed to an non-instrumented system 410, a performance instrumented system 412, or a detailed instrumented system 414. Other embodiments may have more or fewer systems that may be able to perform the request 404.

The distributor 406 may have a configuration 408 that may define how the distributor 406 may perform its distribution functions. The configuration 408 may have conditions under which detailed or performance tracing may be performed, as well as conditions defining when no tracing may be performed.

The conditions 408 may contain filters that limit instrumentation to only a subset of available requests. The filters or objectives may define parameters relating to the input stream, a sampling frequency, or other parameters that may define how and when instrumentation may occur. The objectives may define instrumentation granularity, such a functional component, function, process, memory object, or other level of detail of the data collection. As an example of parameters relating to the input stream, the conditions 408 may indicate that instrumentation may be performed on requests that contain a specific variable with a specific value or range of values. An example of other types of configuration definitions may define a sample frequency for requests that may be instrumented.

An non-instrumented system 410 may process the requests 404 with little or no tracing or instrumentation. In many cases, an non-instrumented system 410 may contain minimal instrumentation that may monitor the status of the system or other actions. The non-instrumented system 410 may not generate instrumentation results that may be analyzed with data gathered from other instrumented systems.

A performance instrumented system 412 may process a request 404 while gathering performance related metrics. The instrumentation may be designed to have minimal impact on the performance of system so that the performance metrics may be considered accurate.

A detailed instrumentation system 414 may process a request 404 while gathering detailed operational information. In many cases, such systems may trace function calls, gather data objects passed between processes and functions, gather object values as certain points during execution, and other data. In many cases, the detailed instrumented system 414 may be significantly slower than the performance system 412.

In the example of embodiment 400, three systems are illustrated as processing the requests 404. In some embodiments, such devices may be identical hardware devices with the same or different software components, while in other embodiments, different devices with different hardware or software components may be used. Such systems that are not similar may have specialized hardware or software components designed for high performance, detailed instrumentation, or other function.

The application output 416 may be received from the various systems that execute the request 404. The application output 416 may be returned to the requestor 402.

In cases where two systems execute the same request, the application output 416 may be compared to determine whether both systems generated the same output. In some embodiments, the output may be considered reliable or substantiated when two parallel devices generate the same output. When the output from two systems is not the same, one of the output values may be selected, the values averaged, or some other action taken.

A results combiner 418 may collect trace data from both the performance instrumented system 412 and the detailed instrumented system 414 and store the results in a set of instrumentation results 420. In some cases, the results combiner 418 may match specific execution runs or characteristics between two or more different trace data. Examples of such matching may be found later in this specification.

Figure 5:
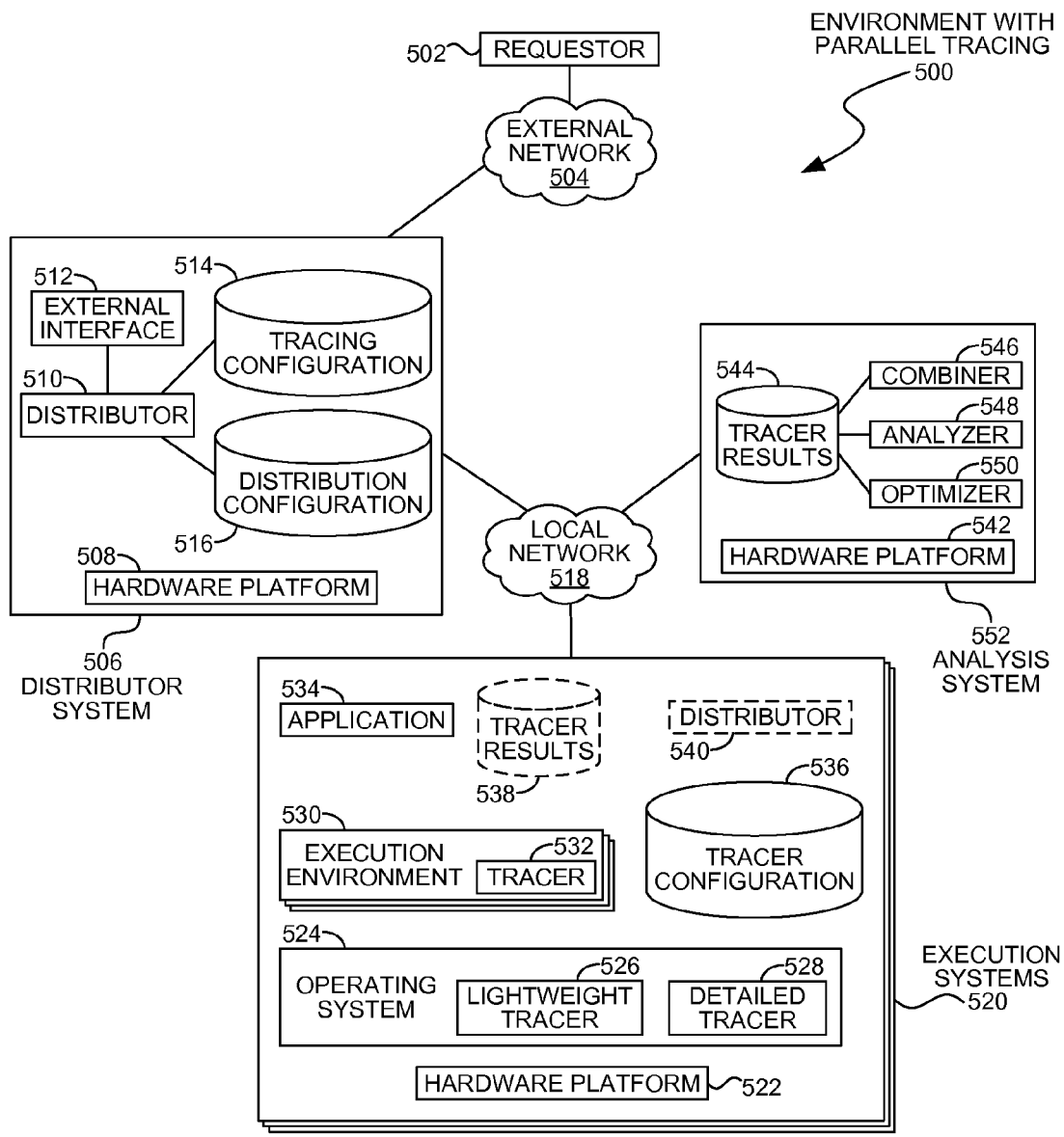
FIG. 5 is a diagram illustration of an embodiment showing a network environment with parallel tracing.

FIG. 5 is a diagram of an embodiment 500 showing a network environment in which different execution systems may generate different levels of trace data. Embodiment 500 illustrates hardware components that may implement some of the operations described in embodiment 400, as well as other embodiments.

The diagram of FIG. 5 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 500 illustrates an example of a system that processes requests received over an external network 504 from a requestor 502. A distributor system 506 may parse the incoming request stream and cause the various execution systems 520 to execute the requests. The application output or response to the request may be passed back to the requestor 502, while any trace data gathered from the execution systems 520 may be stored and used by an analysis system 552.

Each of the various devices illustrated in embodiment 500 may have a hardware platform. The respective hardware platforms may be similar to the hardware platform 104 in embodiment 100. The devices may be any type of hardware platform, such as a personal computer, server computer, game console, tablet computer, mobile telephone, or any other device with a programmable processor.

The distributor system 506 may receive and parse an input stream, then direct units of work to various execution systems 520. The distributor system 506 may operate on a hardware platform 508 and contain a distributor 510 that receives work requests via an external interface 512. The distributor 510 may have a tracing configuration 514 and distribution configuration 516 that define how the units of work may be distributed.

The tracing configuration 514 may define an algorithm, conditions, or other conditions that may define how and when to collect instrumentation data. The tracing configuration 514 may include granularity, sampling rates, sample sizes, data to be collected, and other information. The tracing configuration 514 may also include specific conditions when to trace or not to trace.

Such conditions may evaluate data elements in a request, as well as data elements from external sources. For example, a condition may cause detailed tracing to happen during evening hours when an input parameter is 'blue'.

The distribution configuration 516 may define conditions for allocating other units of work. The distribution configuration 516 may define a load balancing algorithm, for example, that allocates work to devices that are lightly loaded while avoiding sending work to devices that are heavily loaded.

A local network 518 may connect the distributor system 506 with various execution systems 520. The execution systems 520 may have a hardware platform 522 on which an operating system 524 or execution environment 530 may run. An application 534 may be executed on the execution systems 520 to respond to a unit of work, and various tracers may collect data while the application 534 processes the unit of work.

In some embodiments, the application 534 may execute directly on the operating system 524. In such embodiments, an operating system 524 may have a lightweight tracer 526 for collecting performance related measurements, as well as a detailed tracer 528 that may collect detailed information during application execution.

In other embodiments, the application 534 may execute in an execution environment 530. The execution environment 530 may be a virtual machine, such as a process virtual machine, that may manage execution and provide various support functions such as memory allocation, garbage collection, process management, message passing, or other functions. Such execution environments may have a tracer 532.

The various tracers may be configured using a tracer configuration 536 that may define what information to collect and under what circumstances the information may be collected. In some embodiments, the tracer configuration 536 may be sufficient information to cause a single tracer to behave as a performance level tracer or as a detailed tracer.

The trace data 538 may be locally collected tracer output, which may be passed to the analysis system 552.

In some embodiments, the distributor 540 may be located within an execution system 520. In one such embodiment, the system 520 may execute an application 534, which may be executed in part by distributing workload items to multiple processing instances. One of the processing instances may be a detailed instrumented instance, while another processing instance may be a performance tracing instance. In such a case, the operation of embodiment 400 may be performed on a single device.

An analysis system 552 may collect the trace data 538 from various execution systems 520 to gather the results in a centralized trace data 544. The analysis system 552 may operate on a hardware platform 542 which may have a data store for the trace data 544, as well as a combiner 546, an analyzer 548, and an optimizer 550.

The analysis system 552 may gather and aggregate trace data from both performance and detailed tracers. The combiner 546 may create a joined set of results. The analyzer 548 may perform various analyses of the results, such as reports, alerts, or other output. The optimizer 550 may generate optimized settings for the application 534 or other optimizations.

Figure 6:
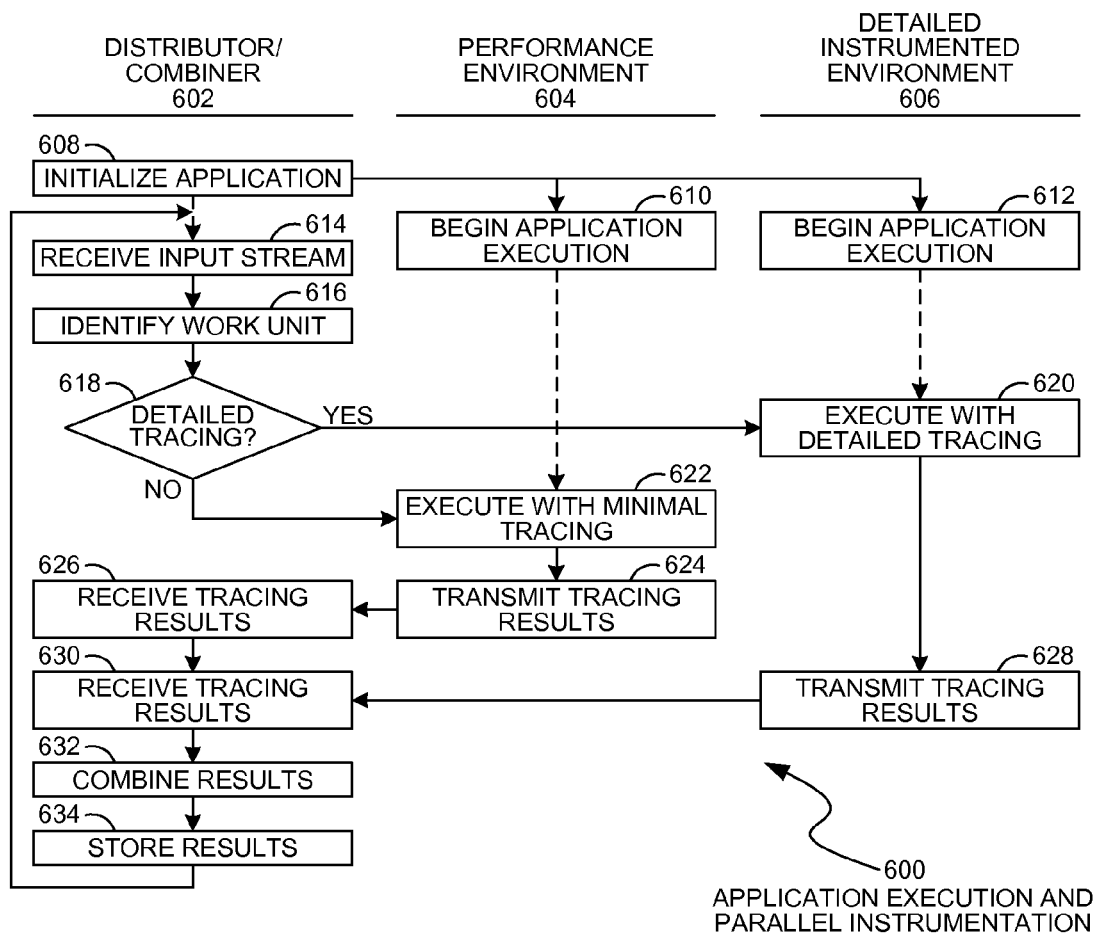
FIG. 6 is a flowchart illustration of an embodiment showing a method for executing an application with parallel instrumentation.

FIG. 6 is a flowchart illustration of an embodiment 600 showing a method for application execution and parallel instrumentation. Embodiment 600 illustrates the operations of a distributor and combiner 602 in the left hand column, a performance environment 604 in the center column, and a detailed instrumented environment 606 in the right hand column. The distributor and combiner 602 may represent the operations of a distributor 406 and combiner 418, while the performance environment 604 and detailed execution environment 606 may represent the operations of a performance instrumented system 412 and detailed instrumented system 414 of embodiment 400, respectively.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

In block 608, an application may be initiated by the distributor and combiner 602, which may cause the application to begin execution in the performance environment 604 in block 610 and in the detailed execution environment 606 in block 612.

The operations of blocks 608 through 612 illustrate an embodiment where an application may be configured to execute, then workload items may be transmitted to the application for processing. In such embodiments, the workload items may be data items consumed by the applications. In other embodiments, a workload item may be executable commands that may be passed to the various environments. In such embodiments, the operations of blocks 608 through 612 may not be performed.

An input stream may be received in block 614. The input stream may be parsed to identify a work unit in block 616. The work unit may be a block of data, executable code, or other workload that may be processed by an execution environment.

A distributor may analyze the work unit in block 618 to determine whether the work unit may be processed using detailed instrumentation or not. If the distributor selects detailed instrumentation in block 618, the workload may be transferred to the detailed instrumentation environment 606 to be executed in block 620. If the distributor does not select detailed instrumentation in block 618, the workload may be transferred to the performance environment 604 to be executed in block 622.

In some cases, the distributor and combiner 602 may send the same workload item to both the performance environment 604 and detailed execution environment 606.

The distributor may create an identifier for the work unit. In some cases, a work unit may include an identifier within the request, such as a sequence number or other identifier that may be used by a requestor to match application results with the request. In some cases, a timestamp, identification code, or other identifier may be created by the distributor and used to correlate results data from two or more trace data gather from different execution environments.

During execution in the performance environment 604, some tracing results may be collected, which may be transmitted in block 624 to the distributor and combiner 602 and received in block 626. Similarly, the detailed instrumented environment 606 may generate tracing results that may be transmitted in block 628 and received by the distributor and combiner 602 in block 630.

The results may be combined in block 632 and stored in block 634. The process may return to block 614 to handle another unit of work.

An example of a method to combine trace data from a performance environment 604 and detailed instrumented environment 606 may be illustrated in embodiment 700.

Figure 7:
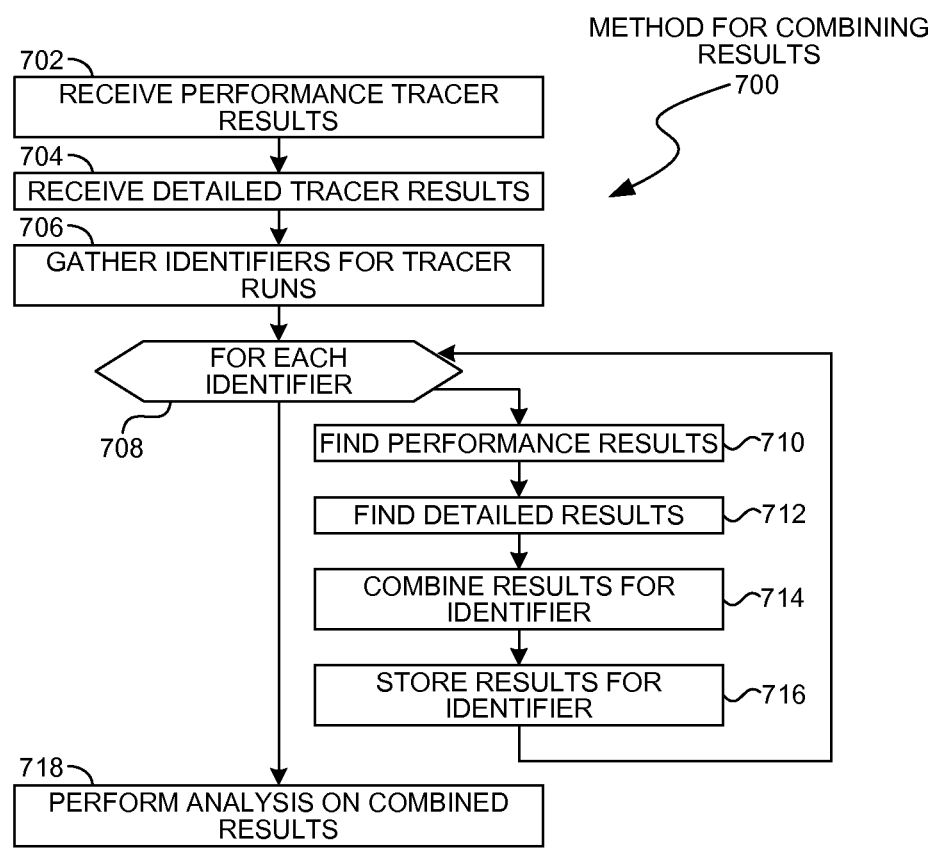
FIG. 7 is a flowchart illustration of an embodiment showing a method for combining results.

FIG. 7 is a flowchart illustration of an embodiment 700 showing a method for combining results from trace runs with different levels of granularity. Embodiment 700 illustrates one example of the combining operations of block 632 of embodiment 600 or the results combiner 418 of embodiment 400.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Performance trace data may be received in block 702 and detailed trace data may be received in block 704. Within each set of results, one or more identifiers may be present. Such identifiers may be identified in block 706.

The identifiers may be any item that may be used to correlate the data between two different tracing operations of an application or work unit. In some cases, each unit of work may have an identifier, which may be used to match detailed and performance trace data when the unit of work has been executed by both types of tracers in separate runs.

In other case, a time stamp, input data value, or other information may be used as an identifier.

For each identifier in block 708, the performance results may be gathered in block 710 and the detailed results may be gathered in block 712. The two sets of results may be combined in block 714 and stored in block 716.

After combining both sets of results, analyses may be performed on the larger set of data in block 718.

Figure 8:
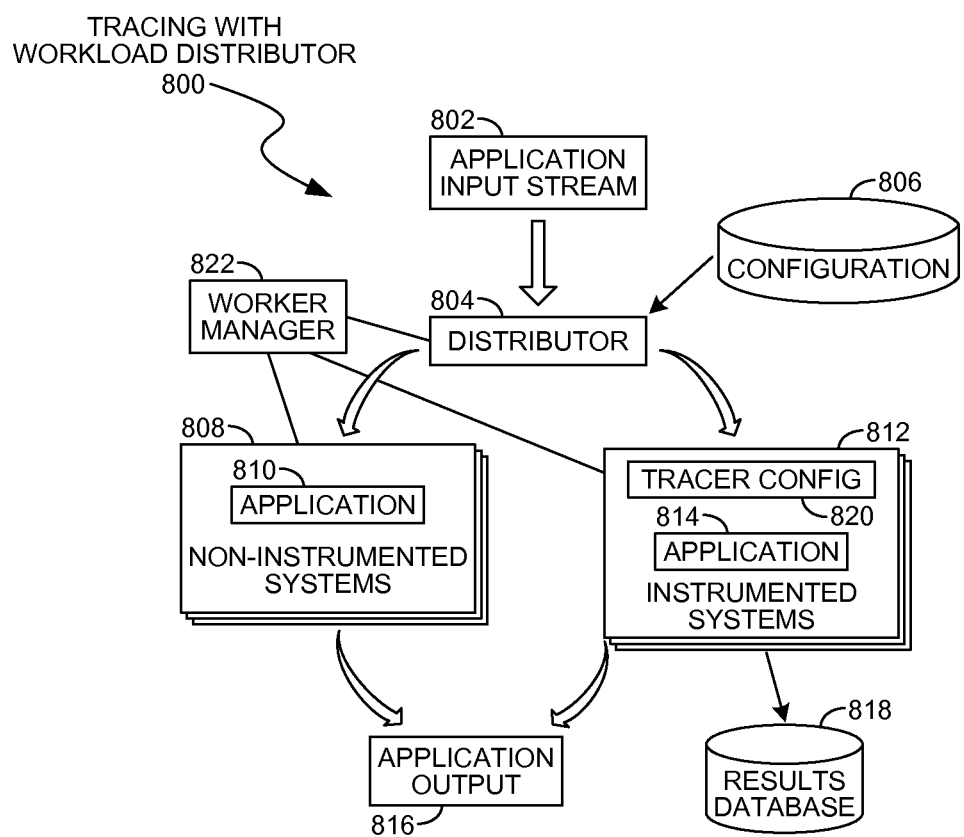
FIG. 8 is a diagram illustration of an embodiment showing tracing with a workload distributor.

FIG. 8 is a diagram illustration of an embodiment 800 showing a system that performs tracing with a workload distributor. Embodiment 800 illustrates a general process whereby a distributor may provide workload distribution, and may also determine how and when tracing may occur during execution.

Embodiment 800 may represent a managed computing environment, such as a cluster computing system or other system where multiple devices may be used to deliver an application. While a conventional cluster or load balanced environment may be used as the example in embodiment 800, the same principles may be applied to any computational system where workload may be partitioned and distributed to multiple instances, threads, processors, devices, or other compute elements.

An application input stream 802 may be sent to a distributor 804, which may partition out work items to various non-instrumented systems 808 and instrumented systems 812. The application output 816 may be produced by either type of systems, but the instrumented systems 812 may produce trace data that may be stored in a results database 818.

The worker systems include the non-instrumented systems 808 and instrumented systems 812. The worker systems may be capable of processing work units, which may be any element of an application. In some embodiments, the application may receive requests items on an application programming interface, then process each request as an individual work item. In such embodiments, incoming requests may be data items that are processed individually and independently.

In some embodiments, the application may be capable of parallel execution, with each work item being an independent computational element that may or may not interact with other work items. In such embodiments, incoming requests may be executable code or a combination of executable code and data objects to be processed by the executable code.

The distributor 804 may use a configuration 806 to define how to allocate the work items across the worker systems. The configuration 806 may define load balancing algorithms and parameters, as well as the data collection configuration.

The data collection configuration may define how and when data items may be collected by any instrumentation on a worker system. In many cases, the data collection configuration may define specific objectives, such as data items to collect and conditions for collecting the data items.

The distributor 804 may create a tracer configuration 820 that may configure the instrumentation on an instrumented system 812 to collect specific data. Some embodiments may create specific or customized tracer configurations 820 for each work element. Such embodiments may allow the system to change the instrumentation with a tracer configuration 820 from run to run, allowing fine-tuned control over the data collection.

Because both the instrumentation and load balancing may be incorporated into the distributor 804, the instrumentation may become a factor in overall load balancing. For example, when the load on the system is heavy and there may be few resources available, the distributor 804 may be able to reduce the instrumentation so that the overall system performance may not suffer. Similarly, the distributor 804 may increase instrumentation during slack periods and there may be an excess of resources.

In systems that may implement a tracer configuration 820, each worker system may be configured as an instrumented or non-instrumented system merely by updating the tracer configuration 820 for a particular work item. In some such systems, all of the worker systems may be identically configured.

Some worker systems may have additional instrumentation capabilities that other, non-instrumented systems may not have. For example, an instrumented system 812 may have different or additional processors, memory, storage, network connectivity and even additional software resources that may support instrumentation. In such systems, the various worker systems may not be identical.

A worker manager 822 may manage the various worker systems by registering the worker systems, determining the availability of the worker systems, and other functions. In many embodiments, the worker manager 822 may deploy a two way authentication mechanism that may allow the distributor 804 to authenticate to the worker systems and vice versa.

The worker manager 822 may collect status information by periodically querying the worker systems or have other regular. The status information may include the capabilities of the worker system, which may include the hardware and software capabilities and configuration, as well as the current load or capacities of the worker system. Some elements may change in real time, such as the availability of the system to process a new request, while other elements may be more static, such as the hardware configuration.

The authentication mechanisms may help ensure that the various devices are supposed to be communicating with each other. When a worker device authenticates itself to a distributor, the distributor may rely on the authentication to assure that the worker is not a malicious device. When the distributor authenticates itself to the worker device, the worker device may rely on the authentication to assure that the distributor has the permission or authority to send work to the worker device. The authentication mechanisms may also be deployed for other scenarios, including instrumentation-as-a-service scenarios.

Figure 9:
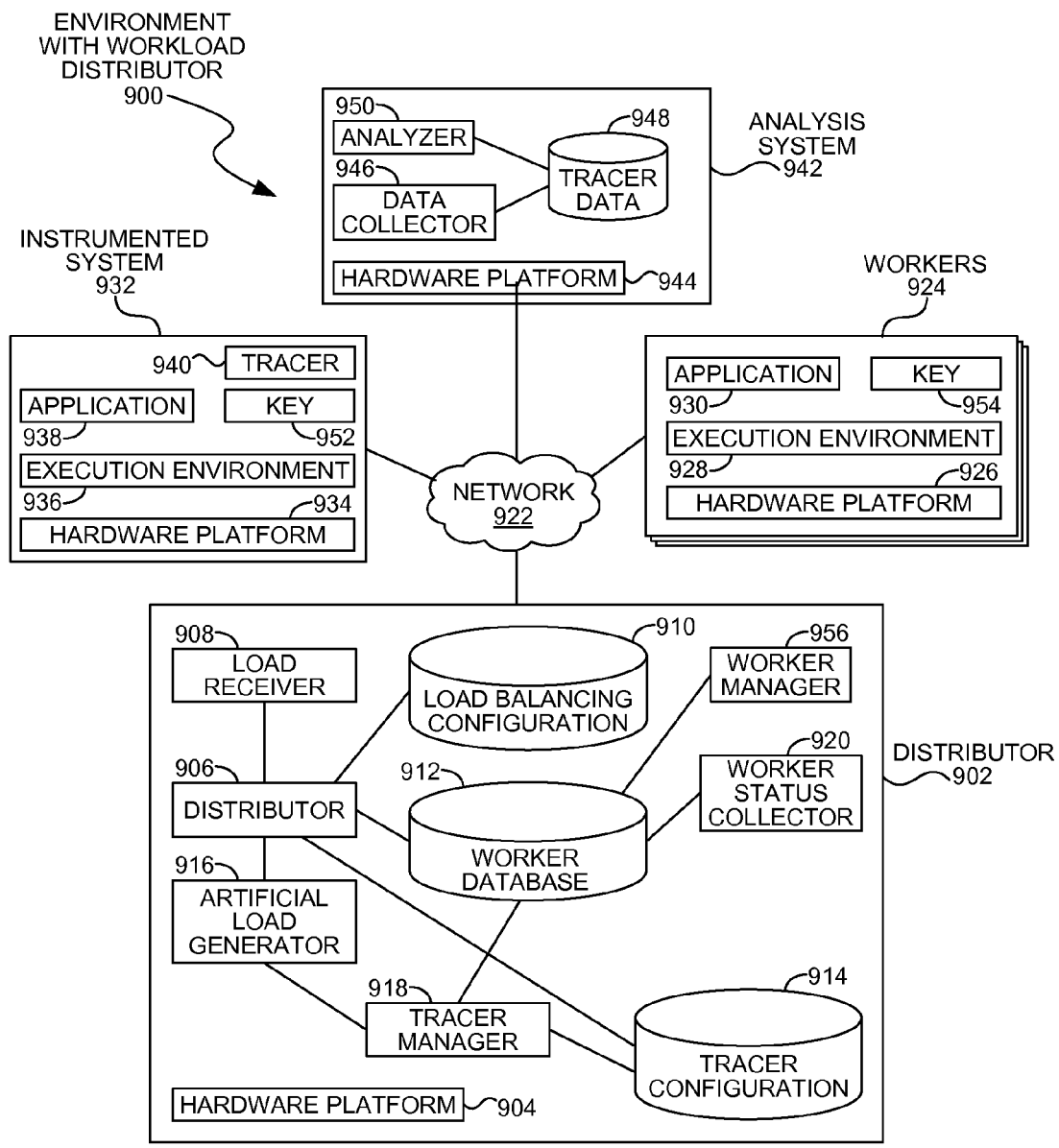
FIG. 9 is a diagram illustration of an embodiment showing a network environment with a workload distributor.

FIG. 9 is a diagram of an embodiment 900 showing a network environment in which a workload distributor may send work units to various worker devices. Embodiment 900 illustrates hardware and software components that may implement some of the operations described in embodiment 800, as well as other embodiments.

The diagram of FIG. 9 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 900 illustrates an environment in which multiple worker systems may perform portions of an application as determined by a distributor device. The distributor 902 may receive a stream of workload items, divide the incoming stream into units of work, determine which worker device may process each unit of work, and cause those units of work to be performed.

The distributor 902 may also determine what type of instrumentation may be performed on a given unit of work. The instrumentation may include various types of tracing, data collection, performance monitoring, or other data that may be used for diagnosis, debugging, administrative monitoring, optimization, or other uses.

The instrumentation may be configurable by the distributor 902. In some cases, the distributor 902 may be capable of routing work units to worker devices that may be preconfigured to perform specific types of tracing or instrumentation. For example, one of the instrumented systems 932 may be preconfigured to perform a specific set of data collection in addition to executing a work unit. In such an example, the distributor 902 may determine when to send a work unit to the instrumented system 932 and when to send another work unit to a worker 924 which may not have instrumentation configured.

In another example, the distributor 902 may transmit a configuration file or other descriptor to an instrumented system 932, where the configuration file may contain specific data items to collect, tests to perform, or other data collection activities. In such an embodiment, the instrumentation or tracers on the instrumented systems 932 may be configurable. In some cases, such a system may be able to execute a work unit with little or no instrumentation, then switch to a high level of instrumentation for the next work unit, as defined in a configuration file.

Each of the various devices illustrated in embodiment 900 may have a hardware platform. The respective hardware platforms may be similar to the hardware platform 104 in embodiment 100. The devices may be any type of hardware platform, such as a personal computer, server computer, game console, tablet computer, mobile telephone, or any other device with a programmable processor.

The distributor 902 may have a hardware platform 904 on which various software components may operate. A distributor 906 may receive an incoming workload stream from a load receiver 908 and determine which worker device will execute the work unit. The distributor 906 may use a load balancing configuration 910 that may define load balancing objectives, algorithms, or other definition for managing a quality of service or other factor. The distributor 906 may refer to a worker database 912 that may include the availability and status of the various worker devices.

The distributor 906 may balance the workload over multiple devices, including instrumented systems 932 and general workers 924. The workload balancing may use multiple devices in parallel to process a workload that may be larger than the capacity of a single device. For example, a large web-scale application may be processed by many devices, which may scale into several hundred server computers in some cases. The load balancing aspect of the distributor 906 may attempt to divide the workload and distribute the workload to available devices.

A tracer configuration 914 may define a set of instrumentation objectives, which may include data to be collected, sample rates, and many other factors.

In many cases, the instrumentation objectives may be in tension with the load balancing objectives. In general, instrumentation and data collection may come at some computational cost, meaning that as the instrumentation is increased, the performance of a system may decrease. In a high speed, high throughput environment, the distributor 906 may balance the instrumentation objectives against the processing capacity to handle the incoming workload. In some instances, the distributor 906 may scale back the instrumentation objectives during high loads so that a quality of service metric for the overall system may be met. In other instances, the distributor 906 may allow the quality of service metric to be missed so that instrumentation objectives may be met. The decisions made by the distributor 906 may be defined in the various configuration files.

A tracer manager 918 may manage the instrumentation to generate the overall objectives for data collection. The tracer manager 918 may cause different data elements to be collected from various work units or instrumented systems 932, then collect the data. In some cases, the tracer manager 918 may perform first level aggregation, summaries, or other initial processing.

The tracer manager 918 may use an artificial load generator 916 to create or modify work units for testing and data collection. For example, the artificial load generator 916 may create a work unit that stresses a specific portion of an application. When such a work unit is performed, the instrumentation may collect data for the work unit. Such a work unit may produce application results that may be discarded by the instrumented system 932.

The distributor 902 may include a worker status collector 920 that may communicate with each worker device to determine a current status. The status may indicate whether the device may be available to accept work units. In some cases, the status may include statistics, such as excess capacity, current workload, or other performance metrics.

A worker manager 956 may manage available worker devices by adding and removing devices into a pool of managed devices. The worker manager 956 may allow new devices to connect, authenticate, and be added to the pool of managed devices. An administrator may use the worker manager 956 to monitor individual devices, configure devices, and add and remove devices to the pool.

In many embodiments, a worker manger 956 may issue authentication keys to worker devices. The authentication keys may be part of a public/private encryption key system, where the private key may be stored on a device and used to secure a communication, and a public key transmitted to a receiving device to decrypt the communication. Such systems may be one example of a system for authenticating between devices, and other embodiments may use other systems.

The workers 924 may operate on a hardware platform 926 to execute an application 930 within an execution environment 928. The application 930 may be a preinstalled set of executable code that processes work items from the distributor 906. In some cases, the application 930 may execute within an execution environment 928, which may be an operating system, virtual machine, framework, or other supporting software component.

The workers 924 may have an authentication key 954 which may be used to authenticate communication with the distributor 902. The key 954 may be any type of authentication component, such as a public/private encryption key set or other component.

The instrumented system 932 may be similarly configured as the workers 924. A hardware platform 934 may support an execution environment 936 that executes the application 938. The instrumented system 932 may include a tracer 940, which may or may not be configurable by the distributor 902 during execution. The instrumented system 932 may also include a key 952 for authentication with the distributor 902.

In some embodiments, the instrumented system 932 may be identical hardware and software configuration as the workers 924. Other embodiments may have different hardware or software configurations between the instrumented system 932 and workers 924.

The tracer 940 may collect instrumentation or trace data and transmit those data to an analysis system 942.

The analysis system 942 may have a hardware platform 944 where a data collector 946 may collect trace data 948 from various tracers. An analyzer 950 may process the tracer for analysis, optimization, summarization, or other functions.

The example of the distributor 902 and other components illustrate devices that may have multiple functions. In different embodiments, each of the various illustrated components may be deployed on a separate device or group of devices. For example, the worker manager 956, worker status collection 920, tracer manager 918, and other functions may be deployed on individual devices or groups of devices.

Figure 10:
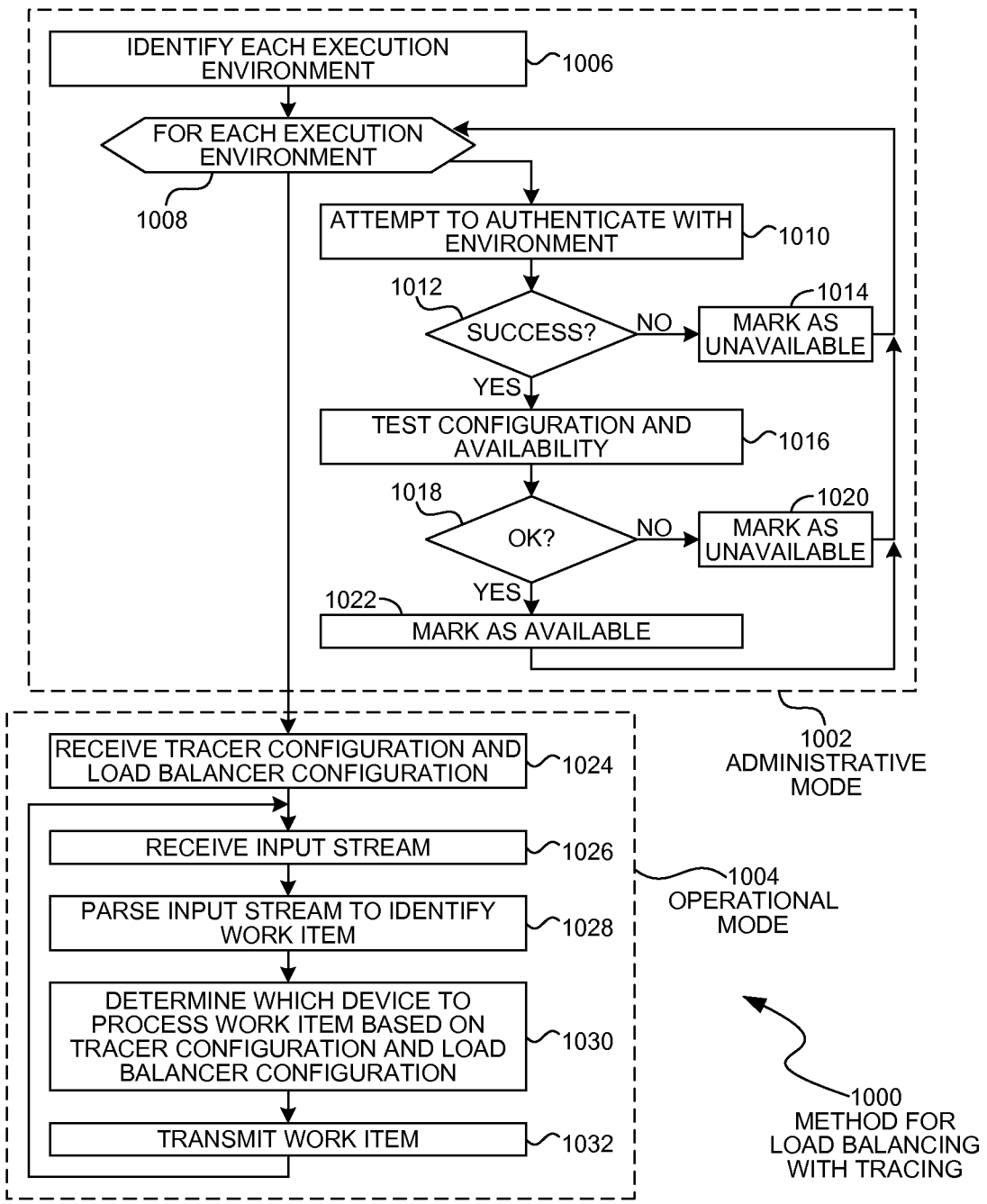
FIG. 10 is a flowchart illustration of an embodiment showing a method for load balancing with tracing.

FIG. 10 is a flowchart illustration of an embodiment 1000 showing a method for configuring a pool of worker devices, then operating the worker devices in a load balanced and instrumentation balanced manner. Embodiment 1000 may illustrate one example of a process that may be implemented in the systems illustrated in embodiments 800 and 900, among others.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 1000 illustrates an operating sequence for establishing and administering a pool of worker resources in block 1002, then an operational mode in block 1004 for parsing an input stream and distributing work units to the worker resources. In the example of embodiment 900, the worker resources may be individual devices, but in other embodiments, the worker resources may be any resource used to process work units. In some cases, the worker resources may be sub-device resources, such as processors, schedulers, threads, or other objects. In other cases, the worker resources may be multiple devices acting together, such as clusters, managed services, or other resource groups.

In an administrative mode in block 1002, the various execution environments may be identified in block 1006. The execution environment may refer to any resource used for processing a work unit. In many cases, the execution environment may be a device, processor, or other computation worker.

For each execution environment in block 1008, an attempt may be made to communicate and authenticate the environment in block 1010. If the authentication is not successful in block 1012, the environment may be marked as unavailable in block 1014.

After successfully authenticating in block 1012, the configuration and availability of the environment may be tested in block 1016. If the configuration and availability are not OK in block 1018, the environment may be marked as unavailable in block 1020. When the environment has successfully authenticated in block 1012 and the configuration and availability are OK in block 1018, the execution environment may be marked as available in block 1022.

The process of blocks 1006-1022 may represent an administrative function that may be performed prior to distributing work to the various execution environment. In some cases, the process of blocks 1006-1022 may be performed in parallel with the operational mode of block 1004. In such cases, the operations of the administrative mode may be an ongoing and repeated check of the various execution environments.

The operational mode of block 1004 may begin by receiving tracer configuration and load balancer configuration in block 1024.

The input stream may be received in block 1026. The input stream may be parsed in block 1028 to identify work items. For a given work item, a determination may be made in block 1030 identifying a device to process the work item. In some cases, a tracer configuration may be created in block 1030 that defines any data collection parameters. Once the determination is made in block 1030, the work item may be transmitted to the selected execution environment in block 1032. The process may return to block 1026 to process the next work item.

Figure 11:
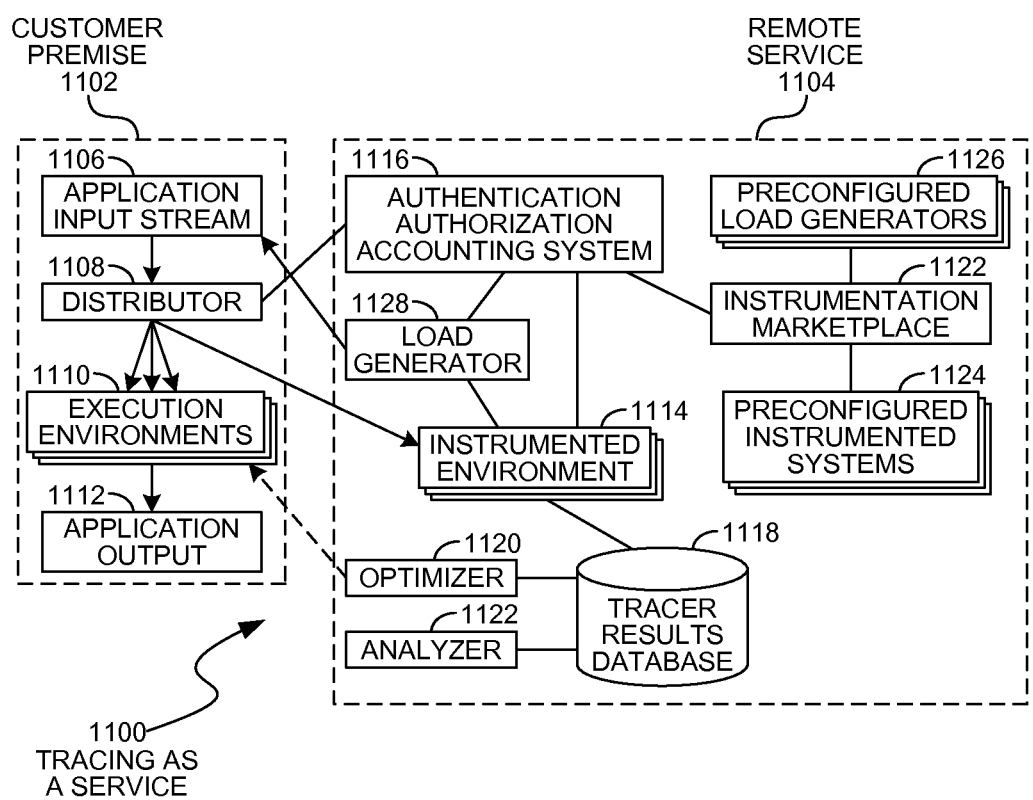
FIG. 11 is a diagram illustration of an embodiment showing tracing as a service.

FIG. 11 is a diagram illustration of an embodiment 1100 showing a tracing as a service. Embodiment 1100 illustrates one configuration of a system where a remote service 1104 may integrate with systems on a customer premise 1102, where the remote service 1104 may provide an instrumented execution environment to process workloads and generate trace data.

A customer premise 1102 may execute an application under control of a user. The customer premise 1102 may be a physical premise, such as a building or business to which the user may have access. In some cases, the customer premise 1102 may include one or more computers that may be owned by and located at a third party's premise, but under the control of the user. An example of such a system may be a cloud hosted execution system where a user may purchase computing resources. The resources may be owned by a third party, but the user may control how those resources may be deployed.

The remote service 1104 may receive work items and execute those work items using an instrumented environment 1114. The instrumented environment 1114 may have various hardware and software components that may capture various trace data while a work item executes. In some cases, the instrumented environment may include tools, measuring algorithms, probes, and other components that may be difficult or costly to install, manage, execute, or otherwise deploy.

Within the customer premise 1102, an application input stream 1106 may be passed to a distributor 1108. The distributor 1108 may parse work items from the input stream and pass the work items to various execution environments 1110. The output of the execution environments 1110 may be application output 1112.

The distributor 1108 may transfer some or all of the work items to an instrumented environment 1114, which may be part of a remote service 1104. In some cases, multiple instances of the instrumented environment 1114 may be used.

A load generator 1128 may create test loads that may be injected into the input stream 1106. The test loads may be data that may be processed by the instrumented environment 1114 to exercise an application. In many cases, the test loads may exercise an application in a more comprehensive manner than a typical or random input stream. Such test loads may perform unit tests or other tests that may be designed to exercise various corner cases and conditions. In some cases, the test loads may subject an application to large loads that may stress the performance of the system. Such test loads may help identify performance bottlenecks and measure overall throughput or response time during peak loading times.

The remote service 1104 may include an authentication, authorization, and accounting system 1116, which may manage various administrative aspects of the remote service 1104. An administrative user interface may permit a user to create an account, define a payment mechanism, and administer the instrumented environments 1114.

An instrumentation marketplace 1122 may be a website or other interface through which a user may browse preconfigured instrumented systems 1124 and preconfigured load generators 1126. Each of the various preconfigured systems may be customized for specific types of data collection. Some preconfigured systems may have additional features, algorithms, or capabilities that may not be available on other preconfigured systems. As such, some preconfigured systems may have different cost structures than other preconfigured systems.

A user may be able to select a preconfigured instrumented system 1124 and preconfigured load generator 1126 as a starting point for configuring a test regime for a given application. In some embodiments, a user may select a preconfigured system then add, remove, or edit various settings to achieve a specific objective.

In some embodiments, a user may be able to save a preconfigured instrumented system in the instrumentation marketplace 1122 for reuse. In some such embodiments, a third party may be able to upload their own instrumented system for sale in the instrumentation marketplace 1122.

Figure 12:
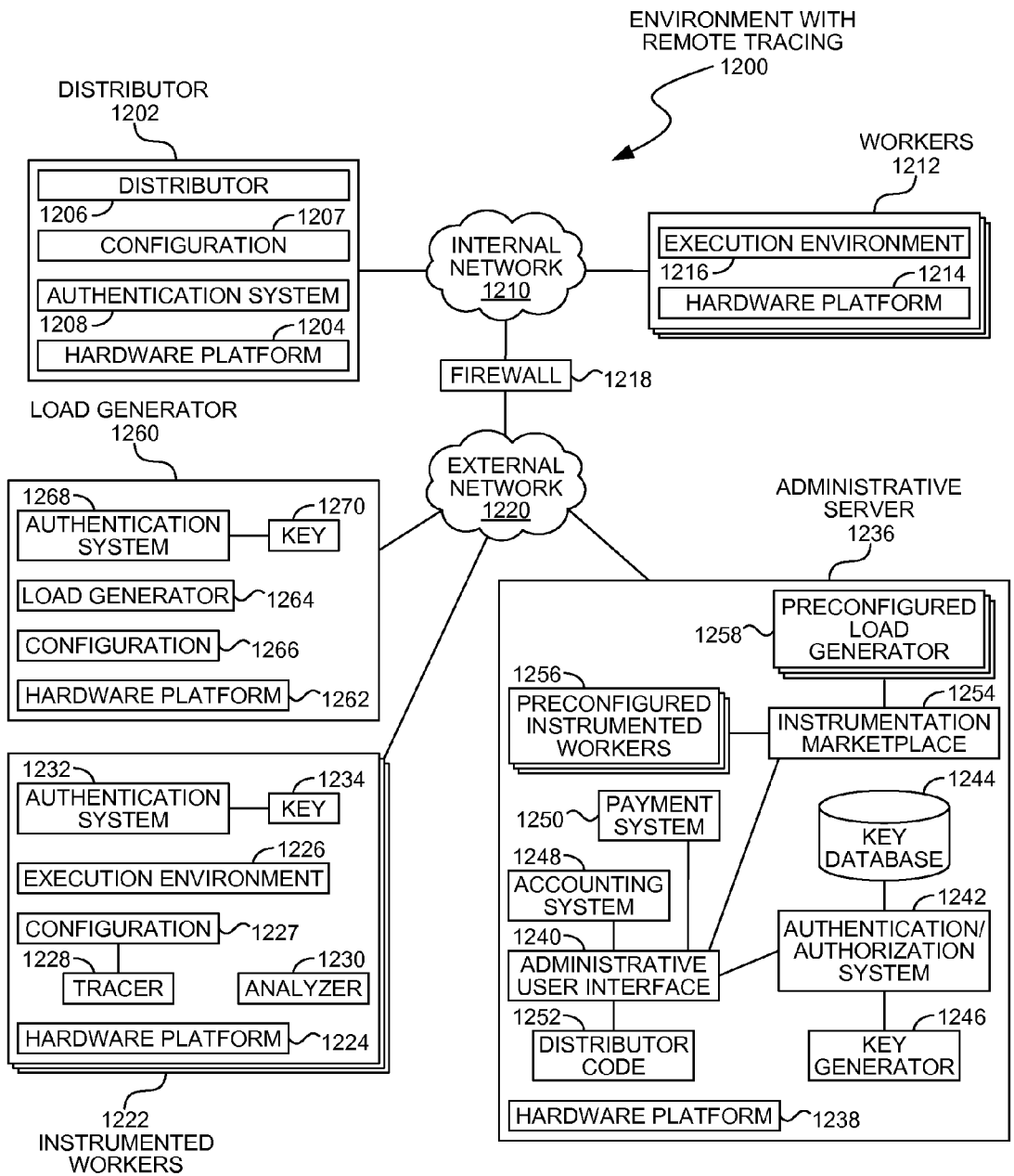
FIG. 12 is a diagram illustration of an embodiment showing a network environment with remote tracing.

FIG. 12 is a diagram of an embodiment 1200 showing a network environment in which a remote service may provide instrumentation or tracing. Embodiment 1200 illustrates hardware and software components that may implement some of the operations described in embodiment 1100, as well as other embodiments.

The diagram of FIG. 12 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Each of the various devices illustrated in embodiment 1200 may have a hardware platform. The respective hardware platforms may be similar to the hardware platform 104 in embodiment 100. The devices may be any type of hardware platform, such as a personal computer, server computer, game console, tablet computer, mobile telephone, or any other device with a programmable processor.

Embodiment 1200 may illustrate an environment in which instrumentation systems may be provided from a remote service, then added to the computational pipeline of a user's system. The instrumentation system may include load generators as well as data collectors which may operate in concert with a user's application to collect various data about the application during execution.

A user may interact with the remote service through an administrative user interface. The user may be able to perform various administrative tasks, such as establishing an account and a method for payment, as well as to select and configure test components that may integrate into the user's application. The remote service may include an instrumentation marketplace in which a user may browse various preconfigured load generators and preconfigured instrumented workers. Once selected, the user may be able to configure or customize a component, then manage how the component may be deployed.

A user's system may include a workload distributor 1202 and various workers 1212 connected within an internal network 1210. The workload distributor 1202 may receive units of work for an application, then distribute the work units to various workers 1212. An example of such a system may be a cluster work environment.

In the example of embodiment 1200, the user's system is illustrated as multiple devices that each may contribute to the execution of a large application. In other embodiments, the components may be deployed on a single device.

The distributor 1202 may operate on a hardware platform 1204 that may include a distributor 1206. The distributor 1206 may be a software component that may receive an input stream, parse the input stream into work units, then cause the work units to be executed on the various workers 1212.

The distributor 1202 may include a configuration 1207 which may include both load balancing and instrumentation objectives. The configuration 1207 may also include information that may be used to distribute some or all of the work units to one or more instrumented workers 1222, which may execute the workloads and collect data about the execution.

An authentication system 1208 may enable the distributor 1202 to establish trusted and, in some cases, secure communications with remote system components.

The workers 1212 may include a hardware platform 1214 and an execution environment 1216 that may execute the various work items. The workers 1212 in embodiment 1200 may be connected to the distributor 1202 through an internal network 1210. In many systems, connections within an internal network 1210 may be considered trusted and secure because of a firewall 1218 and other security measures. As such, the workers 1212 may be deployed without an authentication system.

The firewall 1218 may define a boundary between devices directly under a user's control and devices or services that may be provided by a third party. In some embodiments, the various instrumentation components may be available across an external network 1220, which may include the Internet. In many cases, the various remote services may be made available to many different users.

A third party may provide load generation and instrumentation services to the user by establishing a connection with a distributor 1206 within the user's system.

The distributor 1206 may operate at a location in an application where instrumentation may be desired. In some cases, the distributor 1206 may be a function call or other instruction that may be inserted into an application. Such an instruction may be added to a user's application by a programmer.

The instrumented workers 1222 may execute a portion of an application as defined by the distributor 1206. The instrumented workers 1222 may have a hardware platform 1224 on which an execution environment 1226 may execute work units from the distributor 1206. While executing the work unit, a tracer 1228 may collect data, which may be analyzed by an analyzer 1230. Not shown in embodiment 1200 may be a separate device that may collect and store trace data.

The instrumented workers 1222 may include an authentication system 1232, which may include a key 1234. The key 1234 may be any type of token, key, passphrase, or other item that may be used to authenticate the instrumented worker 1222 to the authentication system 1208 on the distributor 1202. In some cases, the key 1234 may be a set of pubic/private encryption keys.

A load generator 1260 may be another instrumentation component that may be configured and deployed as a remote service. The load generator 1260 may generate artificial loads or other inputs that may be performed by the application under test. In some cases, the load generator 1260 may create unit tests or other inputs that may exercise an application. In other cases, the load generator 1260 may generate large loads that may exercise an application to determine performance bottlenecks or other limits to performance.

The load generator 1260 may have a hardware platform 1262 with a load generator 1264. A configuration 1266 may define how the load generator 1264 may operate, including the type of data to generate along with the timing, frequency, and other operational aspects.

An authentication system 1268 may authenticate the load generator 1260 to the distributor 1202. The authentication system 1268 may include one or more keys 1270 for communicating with the distributor 1202.

An administrative server 1236 may perform many of the setup, configuration, and management operations to deploy various instrumented workers 1222 and load generators 1260. The administrative server 1236 is illustrated as operating on a single hardware platform 1238, although other embodiments may deploy the various components on different platforms.

An administrative user interface 1240 may be a website, application, or other user interface through which a user may perform many administrative tasks. A user may establish an account and create various authentication components using an authentication and authorization system 1242. A key generator 1246 and key database 1244 may respectively create and store the various authentication keys that may be deployed to the instrumentation components and the user's system.

An accounting system 1240 and payment system 1250 may be a mechanism through which a remote service may collect monies for operation. The accounting system 1240 may identify each usage of the various instrumentation components, and the payment system 1250 may transfer money from the user to the service provider in exchange for the use of the system.

Many different payment schemes may be deployed to bill a user for the remote service. For example, a monthly subscription may pay for one or more instrumented systems. In another example, the instrumented systems 1222 and load generator 1260 may be billed on a processor cycle basis, per compute hour, per storage consumed, or other basis.

An instrumentation marketplace 1254 may be an interface through which a user may browse various preconfigured instrumented workers 1256 and preconfigured load generator 1258. The user may then be able to select and further configure a preconfigured component before deploying the component.

Figure 13:
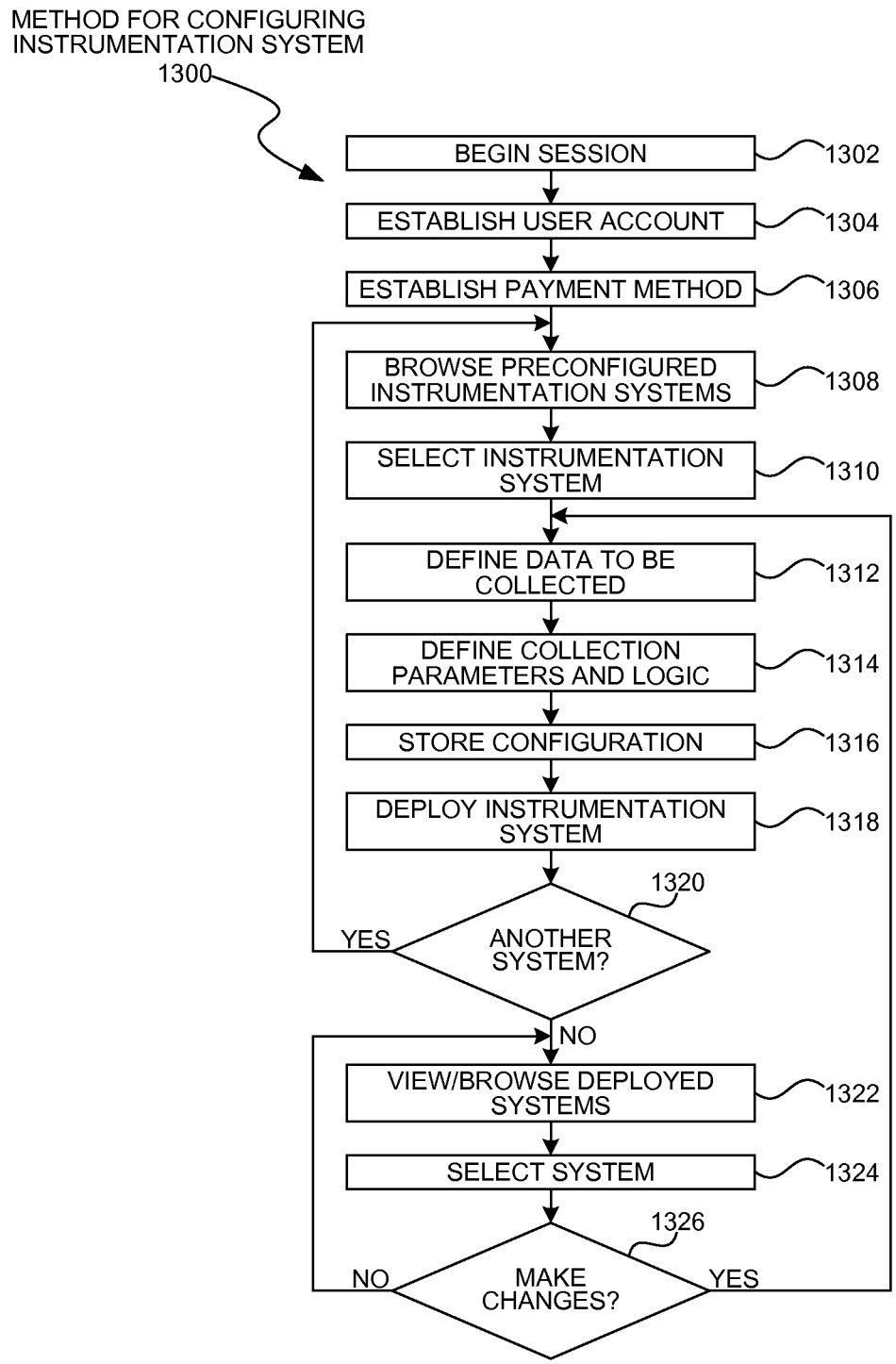
FIG. 13 is a flowchart illustration of an embodiment showing a method for configuring an instrumentation system.

FIG. 13 is a flowchart illustration of an embodiment 1300 showing a method for configuring instrumentation systems. Embodiment 1300 illustrates one example of a process of a user interacting with an administrative server to configure, deploy, and manage instrumentation systems.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 1300 illustrates a method by which a user may set up and deploy instrumentation systems. The instrumentation systems may be instrumented worker devices, load generators, or other components.

A user may begin a session in block 1302, establish a user account in block 1304, and establish a payment method in block 1306. The user account may allow the user to log in at a later time and add, remove, and edit the operation of the various instrumentation systems. The payment method may be the mechanism through which payment may be made to a third party that provides the instrumentation services.

The user may browse preconfigured instrumentation systems in block 1308. The preconfigured systems may have varying capabilities. For example, one instrumented execution environment may have performance monitoring capabilities while another instrumented execution environment may have process or call tracing capabilities. In another example, one load generator may be configured for producing HTTP requests while another load generator may be configured for TCP/IP requests.

After selecting an instrumentation system in block 1310, data to be collected may be defined in block 1312, as well as various collection parameters and logic in block 1314. The configuration variables defined in blocks 1312 and 1314 may be stored in block 1316 to enable an instrumentation system to be deployed in block 1318.

The data to be collected in block 1312 may define specific parameters, types of parameters, or other information regarding data collection. In the case of a load generator, the parameters of block 1312 may define the load to be produced, which may be coordinated with the data collection performed by a corresponding instrumented execution environment.

The collection parameters and logic defined in block 1314 may define the conditions under which data may be collected. The conditions may be events, parameter values, timeframe, sampling rates, or other definitions that may define when data may be collected. In some cases, the conditions may be interpreted by a distributor to determine which work units to transmit to an instrumented execution environment.

After defining the data to be collected and when and how the data may be collected, the configuration may be stored in block 1316. In some cases, the stored configuration may be added as another preconfigured instrumented system in the instrumentation marketplace. Such a storage may be made accessible to the public at large or may be restricted to only the user who created the configuration.

The instrumented system may be deployed in block 1318 to interface with a user's system.

If another system is to be configured in block 1320, the process may return to block 1308. Once all systems are deployed, a user may browse and view deployed systems in block 1322. The user may select a system in block 1324 and, if the user wishes to make changes to the system in block 1326, the process may return to block 1312.

Figure 14:
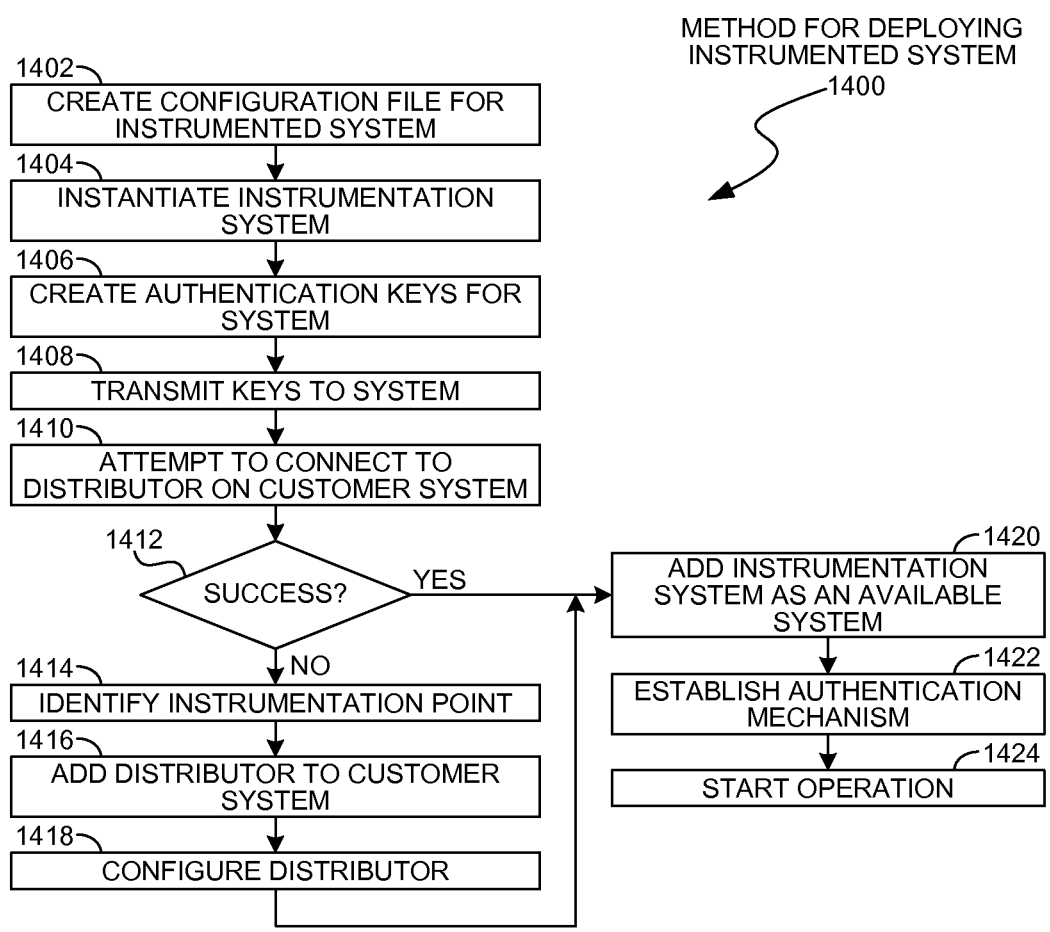
FIG. 14 is a flowchart illustration of an embodiment showing a method for deploying instrumented system.

FIG. 14 is a flowchart illustration of an embodiment 1400 showing a method for deploying an instrumented system. Embodiment 1400 illustrates one example of the deployment of an instrumented system, such as may be performed in block 1318 of embodiment 1300.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 1400 may illustrate one example of a process that may be performed to deploy an instrumented system. The instrumented system may be a load generator, instrumented worker, or other component.

A configuration file for the instrumented system may be created in block 1402, and the instrumented system may be instantiated in block 1404. In some embodiments, each instrumented system may be a virtual machine or other component that may be instantiated and managed within a datacenter environment.

Authentication keys may be created for the system in block 1406 and the keys may be transmitted to the system in block 1408. In blocks 1406 and 1408, any protocols or other configuration may be performed to connect to a distributor or to an administrative system.

An attempt may be made in block 1410 to connect to a distributor on a customer's system. If the connection is not successful in block 1412, the distributor may be installed and configured by identifying the instrumentation point in block 1414 and adding the distributor to the customer system in block 1416. In many cases, a programmer may add a function call or make other changes to the customer's application to add the distributor. The distributor may be configured in block 1418 to communicate with the instrumented system. The process may proceed to block 1420.

After the distributor is configured in block 1418 or there is success in connecting in block 1412, the instrumentation system may be added to the distributor as an available system in block 1420. The authentication mechanism may be established in block 1422 and the system may start operation in block 1424.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed by a computer processor on a first device, said method comprising:
   executing an application, said application processing data objects;
   with a tracer which obtains data from instrumentation in the application when an instrumentation condition instructs the tracer to monitor at least one of debugging data and performance data with respect to the application, and while said application is executing, and when the instrumentation condition occurs, monitoring a first function within said application, said first function receiving a first data object and returning a second data object;
   identifying said first data object as being passed to said first function;
   identifying said second data object as being returned from said first function;
   while not obfuscating a name of the first function, selectively obfuscating said first data object to create a first obfuscated data object;
   while not obfuscating the name of the first function, selectively obfuscating said second data object to create a second obfuscated data object; and
   storing said first obfuscated data object and said second obfuscated data object.

2. The method of claim 1 further comprising:
   transmitting said first obfuscated data object and said second obfuscated data object to a remote device for analysis.

3. The method of claim 2 further comprising:
   receiving analysis results from said remote device, said analysis results comprising said first obfuscated data object.

4. The method of claim 3 further comprising:
   determining said first data object from said first obfuscated data object.

5. The method of claim 4 further comprising:
   storing said first data object and said first obfuscated data object as a record in a lookup database.

6. The method of claim 5, said first data object being obfuscated by performing a lossy hash function on said first data object.

7. The method of claim 5, said first data object being obfuscated by creating a randomized representation of said first data object.

8. The method of claim 4, said first obfuscated data object being determined by encrypting said first data object.

9. The method of claim 8, said first data object being determined from said first obfuscated data object by decrypting said first obfuscated data object.

10. The method of claim 9, said encrypting being performed using a public key/private key encryption system.

11. The method of claim 1:
    identifying a third data object being passed to said first function along with said first data object; and
    creating said first obfuscated data object comprising said first data object and said third data object.

12. The method of claim 1:
    identifying a third data object being passed to said first function along with said first data object; and
    creating a third obfuscated data object comprising said third data object.

13. A system comprising:
    a processor, said processor being a hardware processor;
    an execution environment that executes an application using said processor, said execution environment having a process scheduler;
    a tracer that monitors said application during execution in said execution environment to obtain at least one of debugging data and performance data with respect to the application when an instrumentation condition occurs, said tracer that gathers actions performed by said process scheduler when the instrumentation condition occurs, one of said actions comprising function calls having input parameters and output parameters;
    an obfuscator that receives said input parameters and selectively creates obfuscated input parameters, and receives said output parameter and selectively creates obfuscated output parameters while not obfuscating a function name related to such input parameters;

a communicator that transmits said obfuscated input parameters and said obfuscated output parameters and said function name to a remote device.

14. The system of claim 13 further comprising:
a storage device that stores said obfuscated input parameters and said obfuscated output parameters in a storage device.

15. The system of claim 13, said obfuscator creating said obfuscated input parameters by executing a hash function.

16. The system of claim 13, said obfuscator creating a lookup database comprising a record comprising a first obfuscated input parameter and a first raw input parameter.

17. The system of claim 13, said obfuscator that creates a single obfuscated input parameter from a plurality of input parameters passed to a first function.

18. A method comprising:
executing an application in a first secure location, said application processing confidential data, said application further comprising a first function receiving a first confidential parameter;

during said executing, tracing said application within said first secure location to obtain at least one of debugging data and performance data with respect to the application when an instrumentation condition occurs, and when said instrumentation occurs, said tracing comprising identifying said first function and said first confidential parameter;

selectively obfuscating said first confidential parameter to create a first obfuscated parameter while not obfuscating a function name related to the first confidential parameter; and transmitting said first obfuscated parameter and the function name to a remote device, said remote device being located outside of said first secure location.

19. The method of claim 18, said name being transmitted in a cleartext manner.

20. The method of claim 18 further comprising:
receiving an optimization file comprising said first obfuscated parameter;
determining said first confidential parameter from said first obfuscated parameter; and
consuming said optimization file while executing said application.

21. The method of claim 20 further comprising:
creating a record in a database comprising said first confidential parameter and said first obfuscated parameter.

22. The method of claim 21, said obfuscating comprising executing a lossy hash function.

* * * * *